(12) United States Patent
Teranishi

(10) Patent No.: US 11,878,732 B2
(45) Date of Patent: Jan. 23, 2024

(54) WORK VEHICLE

(71) Applicant: KOMATSU LTD., Tokyo (JP)

(72) Inventor: Yuichi Teranishi, Tokyo (JP)

(73) Assignee: KOMATSU LTD., Tokyo (JP)

(*) Notice: Subject to any disclaimer, the term of this patent is extended or adjusted under 35 U.S.C. 154(b) by 618 days.

(21) Appl. No.: 16/768,399

(22) PCT Filed: Feb. 20, 2019

(86) PCT No.: PCT/JP2019/006304
§ 371 (c)(1),
(2) Date: May 29, 2020

(87) PCT Pub. No.: WO2019/234989
PCT Pub. Date: Dec. 12, 2019

(65) Prior Publication Data
US 2020/0317250 A1    Oct. 8, 2020

(30) Foreign Application Priority Data

Jun. 6, 2018  (JP) .................................. 2018-108977

(51) Int. Cl.
*B62D 1/12* (2006.01)
*B62D 5/28* (2006.01)
(Continued)

(52) U.S. Cl.
CPC ................. *B62D 1/12* (2013.01); *B62D 5/28* (2013.01); *B62D 6/008* (2013.01); *G05G 2009/04766* (2013.01)

(58) Field of Classification Search
CPC . B62D 1/12; B62D 5/28; B62D 6/008; B62D 12/00; B62D 5/06; B62D 6/00; G05G 2009/04766; G05G 9/047

(Continued)

(56) References Cited

U.S. PATENT DOCUMENTS 6,179,082 B1    1/2001  Ikari
2002/0063015 A1  5/2002  Sugitani et al.
(Continued)

FOREIGN PATENT DOCUMENTS

CN    1572626 A    2/2005
CN    1827447 A    9/2006
(Continued)

OTHER PUBLICATIONS

The Office Action for the corresponding Chinese application No. 201980006304.X, dated Dec. 13, 2021.
(Continued)

*Primary Examiner* — Scott A Reinbold
(74) *Attorney, Agent, or Firm* — Global IP Counselors, LLP

(57) ABSTRACT

A work vehicle includes a hydraulic actuator that changes an actual steering angle, an actual steering angle detecting part, an operating unit that performs a steering operation, a position adjusting control part that controls the position adjusting part based on the actual steering angle, and a steering control part that controls the hydraulic actuator. The operating unit includes a support part, a rotating part supported rotatably by the support part, an operating part supported rotatably by the support part or the rotating part, a biasing part that biases the operating part to a predetermined position with respect to the rotating part, and a position adjusting part that adjusts a rotation angle of the rotating part with respect to the support part. The biasing part may produce various counterforces and may increase or reduce an increasing rate of a counterforce with respect to the relative angle.

18 Claims, 33 Drawing Sheets

(51) Int. Cl.
*B62D 6/00* (2006.01)
*G05G 9/047* (2006.01)

(58) Field of Classification Search
USPC .......................................................... 180/6.32
See application file for complete search history.

(56) References Cited

U.S. PATENT DOCUMENTS

| | | |
|---|---|---|
| 2004/0238265 A1 | 12/2004 | Tsuchiya |
| 2006/0200290 A1 | 9/2006 | Chino et al. |
| 2019/0071119 A1* | 3/2019 | Takenaka ................ E02F 9/225 |

FOREIGN PATENT DOCUMENTS

| | | | |
|---|---|---|---|
| CN | 102530050 A | | 7/2012 |
| DE | 198 45 814 A1 | | 4/1999 |
| EP | 3 254 935 A1 | | 12/2017 |
| JP | 2000-250649 A | | 9/2000 |
| JP | 2002-160642 A | | 6/2002 |
| JP | 2006-168515 A | | 6/2006 |
| JP | 2006168515 A | * | 6/2006 |
| JP | 2016-40169 A | | 3/2016 |
| JP | 2016040169 A | * | 3/2016 |
| WO | 2017/209058 A1 | | 12/2017 |

OTHER PUBLICATIONS

The International Search Report for the corresponding international application No. PCT/JP2019/006304, dated Apr. 23, 2019.
The extended European search report for the corresponding European application No. 19815917.0, dated Jul. 5, 2021.

* cited by examiner

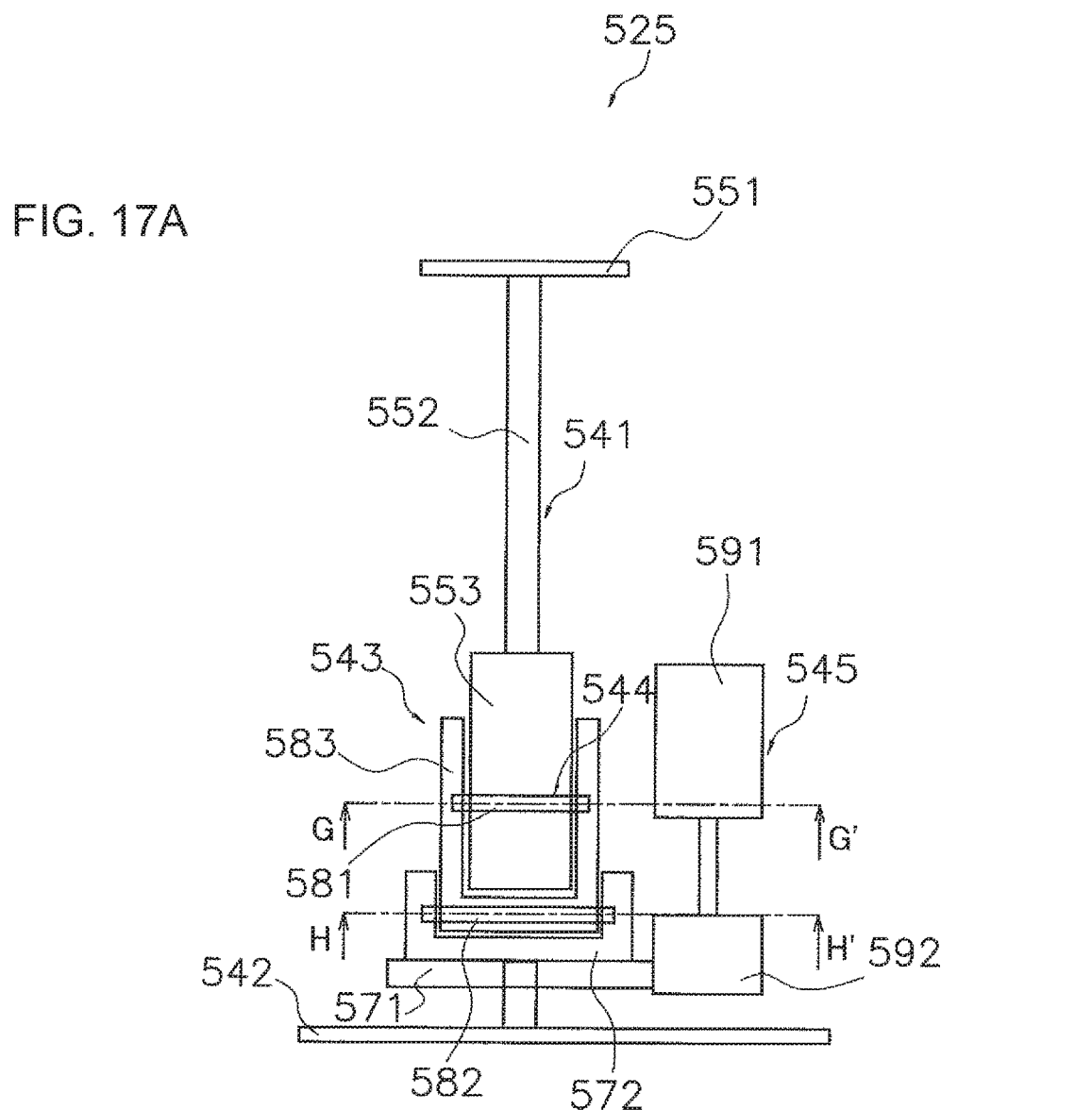
FIG. 17A
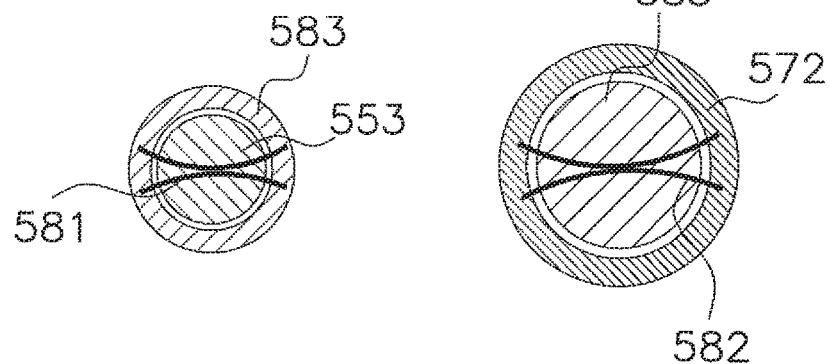
FIG. 17B
FIG. 17C

WORK VEHICLE

CROSS-REFERENCE TO RELATED APPLICATIONS

This application is a U.S. National stage application of International Application No. PCT/JP2019/006304, filed on Feb. 20, 2019. This U.S. National stage application claims priority under 35 U.S.C. § 119(a) to Japanese Patent Application No. 2018-108977, filed in Japan on Jun. 6, 2018, the entire contents of which are hereby incorporated herein by reference.

BACKGROUND

Field of the Invention

The present invention relates to a work vehicle.

Background Information

There is a steering system (also known as steer-by-wire) in which the rotation amount and the like of a steering input device is detected with sensors, and a control signal that is calculated on the basis of sensor information of the sensors is transmitted via a wire harness to an actuator that controls the turning angles of the tires. A joystick lever may be used in place of a steering wheel as the input device of this type of steering system in a vehicle.

In a steer-by-wire system that uses a joystick lever as the input device, there may be provided a joystick lever with which a rotation and operation is performed, and a motor that imparts a counterforce and the like to the rotation and operation in order to produce an operational feel in the turning operation of the joystick lever (for example, see Japanese Patent Laid-open No. 2002-160642).

SUMMARY

In order to produce sufficient counterforce torque in the joystick lever in the vehicle of Japanese Patent Laid-open No. 2002-160642, it is necessary to provide an intensifying device (speed reducer) between the motor and the joystick lever to increase the motor torque.

However, if the speed reduction ratio is increased, the operational counterforce may become too large when operating the joystick lever. For example, if the counterforce is not desired to be generated, the current supplied to the motor may be set to 0, but even in that case, the friction torque and cogging torque of the motor are increased by the speed reducer, and a counterforce may be produced on the joystick lever.

As a result, it is necessary to reduce the speed reduction ratio of the speed reducer and use a motor that has a large torque and it becomes necessary to use a large-scale motor. In this way, when the operating unit increases in size due to the use of the large-scale motor, there is another problem in that it becomes difficult to adjust the position of the operating unit to a position that suits the body type or the like of the user.

An object of the present invention is to provide a work vehicle comprising an operating unit the size of which can be reduced and which can enable an operator to perceive information pertaining to the work vehicle.

A work vehicle according to an aspect of the invention comprises a hydraulic actuator, an actual steering angle detecting part, an operating unit, a position adjustment control part, and a steering control part. The hydraulic actuator changes an actual steering angle. The actual steering angle detecting part detects the actual steering angle. The operating unit performs a steering operation and has a support part, a rotating part, an operating part, a biasing part, a position adjusting part. The rotating part is rotatably supported by the support part. The operating part is rotatably supported by the support part or the rotating part and is operated and rotated by an operator. The biasing part biases the operating part to a predetermined position with respect to the rotating part. The position adjusting part adjusts the rotation angle of the rotating part with respect to the support part. The position adjustment control part controls the position adjusting part on the basis of the actual steering angle. The steering control part controls the hydraulic actuator on the basis of the rotation and operation of the operating part. In a situation in which the operating part is operated and rotated in a predetermined direction with respect to the rotating part, when the absolute value of the relative angle of the operating part with respect to the rotating part is equal to or greater than a first predetermined angle, the biasing part increases the increasing rate of a counterforce with respect to the relative angle more in comparison to when the absolute value of the relative angle is less than the first predetermined angle. When the absolute value of the relative angle is equal to or greater than a second predetermined angle which is an angle equal to or greater than the first predetermined angle, the biasing part decreases the increasing rate of the counterforce with respect to the relative angle more in comparison to when the absolute value of the relative angle is smaller than the second predetermined angle and the absolute value of the relative angle is equal to or greater than the first predetermined angle.

A work vehicle according to another aspect of the invention comprises a hydraulic actuator, an actual steering angle detecting part, an operating unit, a position adjustment control part, and a steering control part. The hydraulic actuator changes the actual steering angle. The actual steering angle detecting part detects the actual steering angle. The operating unit performs a steering operation and has a support part, a rotating part, an operating part, a biasing part, a position adjusting part. The rotating part is rotatably supported by the support part. The operating part is rotatably supported by the support part or the rotating part and is operated and rotated by an operator. The biasing part biases the operating part to a predetermined position with respect to the rotating part. The position adjusting part adjusts the rotation angle of the rotating part with respect to the support part. The position adjustment control part controls the position adjusting part on the basis of the actual steering angle. The steering control part controls the hydraulic actuator on the basis of the rotation and operation of the operating part. In the situation in which the operating part is operated and rotated in a predetermined direction with respect to the rotating part, when an absolute value of a relative angle of the operating part with respect to the rotating part is less than a first predetermined angle, the biasing part generates a counterforce that corresponds to the absolute value of the relative angle, increases the counterforce up to a predetermined counterforce when the absolute value of the relative angle is the first predetermined angle, and after the counterforce at the first predetermined angle has reached the predetermined counterforce, generates a counterforce that corresponds to the relative angle.

According to the present invention, there can be provided a work vehicle comprising an operating unit the size of which can be reduced and which can enable an operator to perceive information pertaining to the work vehicle.

BRIEF DESCRIPTIONS OF DRAWINGS

FIG. 17A is a schematic view illustrating a configuration of the operating unit of a modified example of the embodiments according to the present invention, and FIG. 17B is a reference arrow cross-sectional view along line G to G' in FIG. 17A. FIG. 17C is a reference arrow cross-sectional view along line H to H' in FIG. 17A.

DETAILED DESCRIPTION OF EMBODIMENT(S)

The following is an explanation of a wheel loader as an example of a work vehicle according to the present invention with reference to the drawings.

Embodiment 1

A wheel loader 1 of a first embodiment according to the present invention is explained hereinbelow.

1. Configuration (1-1. Outline of Configuration of Wheel Loader)

Figure 1:
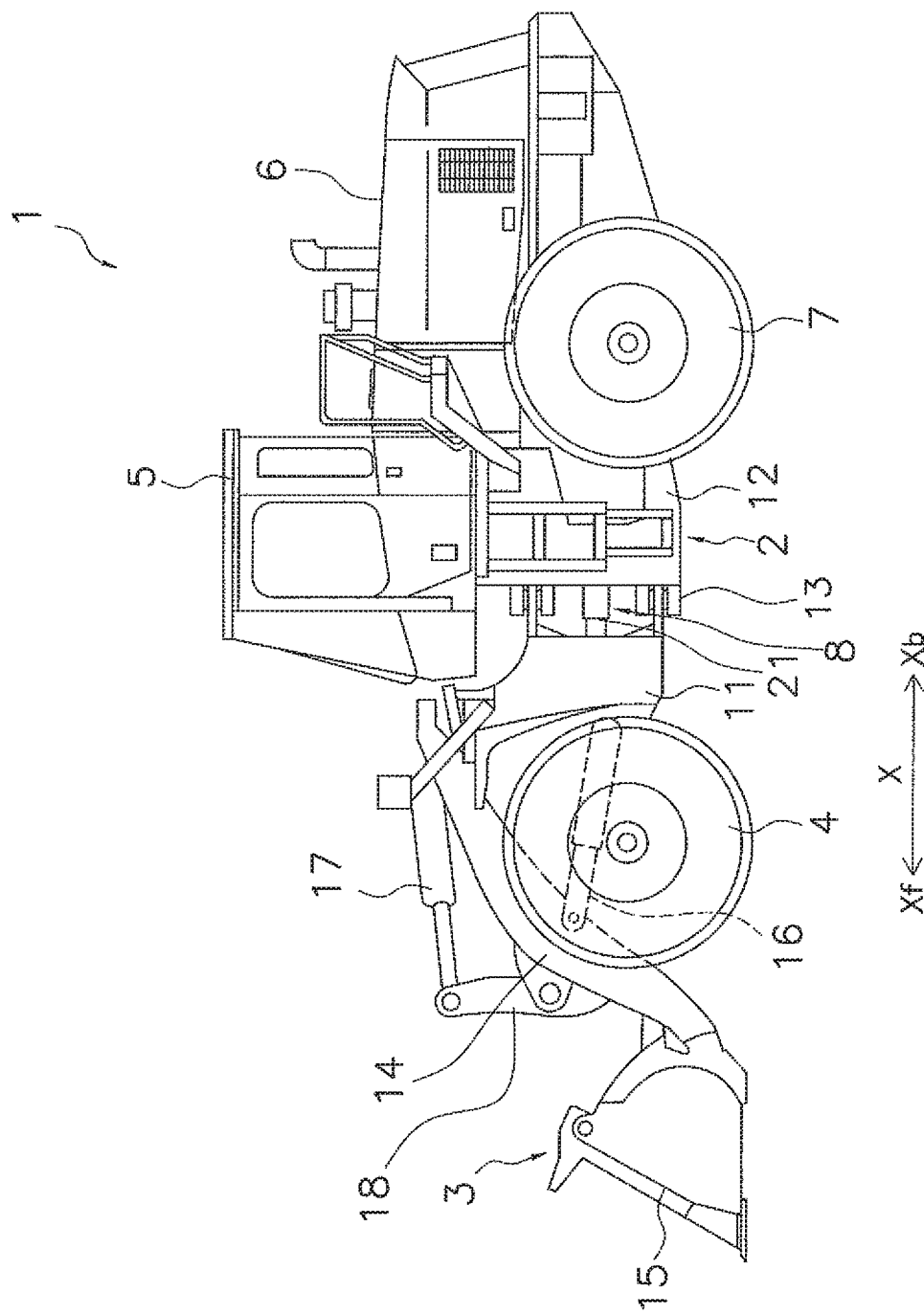
FIG. 1 is side view illustrating a wheel loader of a first embodiment according to the present invention.

FIG. 1 is a schematic view of a configuration of the wheel loader 1 of the present embodiment. The wheel loader 1 of the present embodiment is provided with a vehicle body frame 2, a work implement 3, a pair of front tires 4, a cab 5, an engine room 6, a pair of rear tires 7, and a steering operating device 8 (refer to FIG. 2). In the following explanations, "front," "rear," "right," "left," "up," and "down" indicate directions relative to a state of looking forward from the driver's seat. "Vehicle width direction" and "left-right direction" have the same meaning. In FIG. 1, "X" indicates the front-back direction and "Xf" is used to indicate the forward direction and "Xb" is used to indicate the rearward direction. In addition, the left-right direction is indicated with "Y," and "Yr is used to indicate the rightward direction and "Yl" is used to indicate the leftward direction in the following drawings.

The wheel loader 1 is able to carry out work such as earth and sand loading by using the work implement 3.

The vehicle body frame 2 is a so-called articulated construction and includes a front frame 11, a rear frame 12, and a coupling shaft part 13. The front frame 11 is arranged in front of the rear frame 12. The coupling shaft part 13 is provided in the center in the vehicle width direction and couples the front frame 11 and the rear frame 12 to each other in a manner that allows swinging. The pair of front tires 4 are attached to the left and right of the front frame 11. The pair of rear tires 7 are attached to the left and right of the rear frame 12.

The work implement 3 is driven by hydraulic fluid from a work implement pump which is not illustrated. The work implement 3 includes a boom 14, a bucket 15, a lift cylinder 16, and a bucket cylinder 17. The boom 14 is mounted onto the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. A handle or a joystick lever 51 (see FIG. 2 below) for performing steering operations, an lever for operating the work implement 3, and various display devices are arranged inside the cab 5. The engine room 6 is arranged to the rear of the cab 5 and on the rear frame 12 and contains an engine.

While explained in detail below, the steering operating device 8 has steering cylinders 21 and 22 and changes the vehicle body frame angle of the front frame 11 with respect to the rear frame 12 by changing the flow rate of oil supplied to the steering cylinders 21 and 22 to change the traveling direction of the wheel loader 1. The steering cylinders 21 and 22 correspond to an example of the hydraulic actuator.

Figure 2:
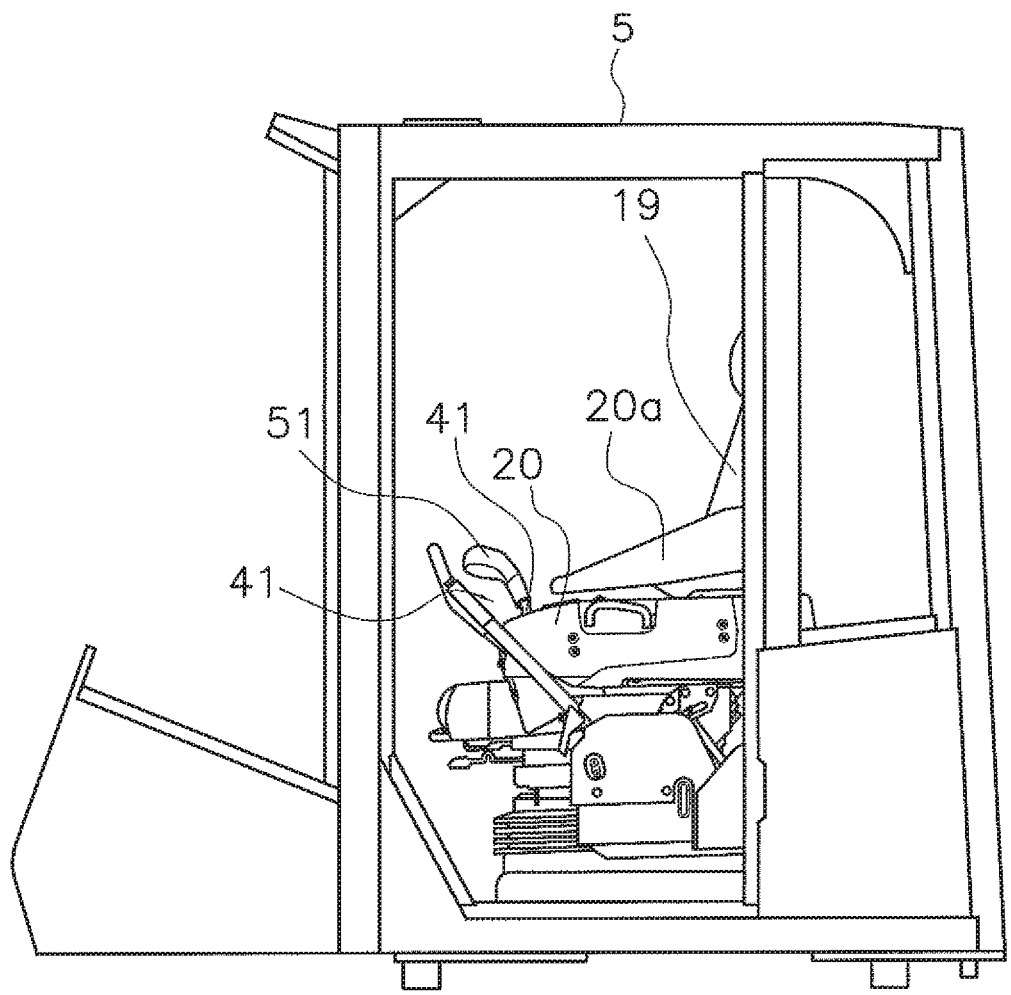
FIG. 2 is a side view illustrating the vicinity of a cab in FIG. 1.

FIG. 2 is a partial side view of the cab 5. An operator's seat 19 is provided in the cab 5 and a console box 20 is arranged to the side of the operator's seat. An arm rest 20a is arranged on the upper side of the console box 20. A lever unit 41 is arranged at the front end part of the console box 20, and the joystick lever 51 is arranged facing upward from the front end part of the console box 20.

(1-2. Steering Operating Device)

Figure 3:
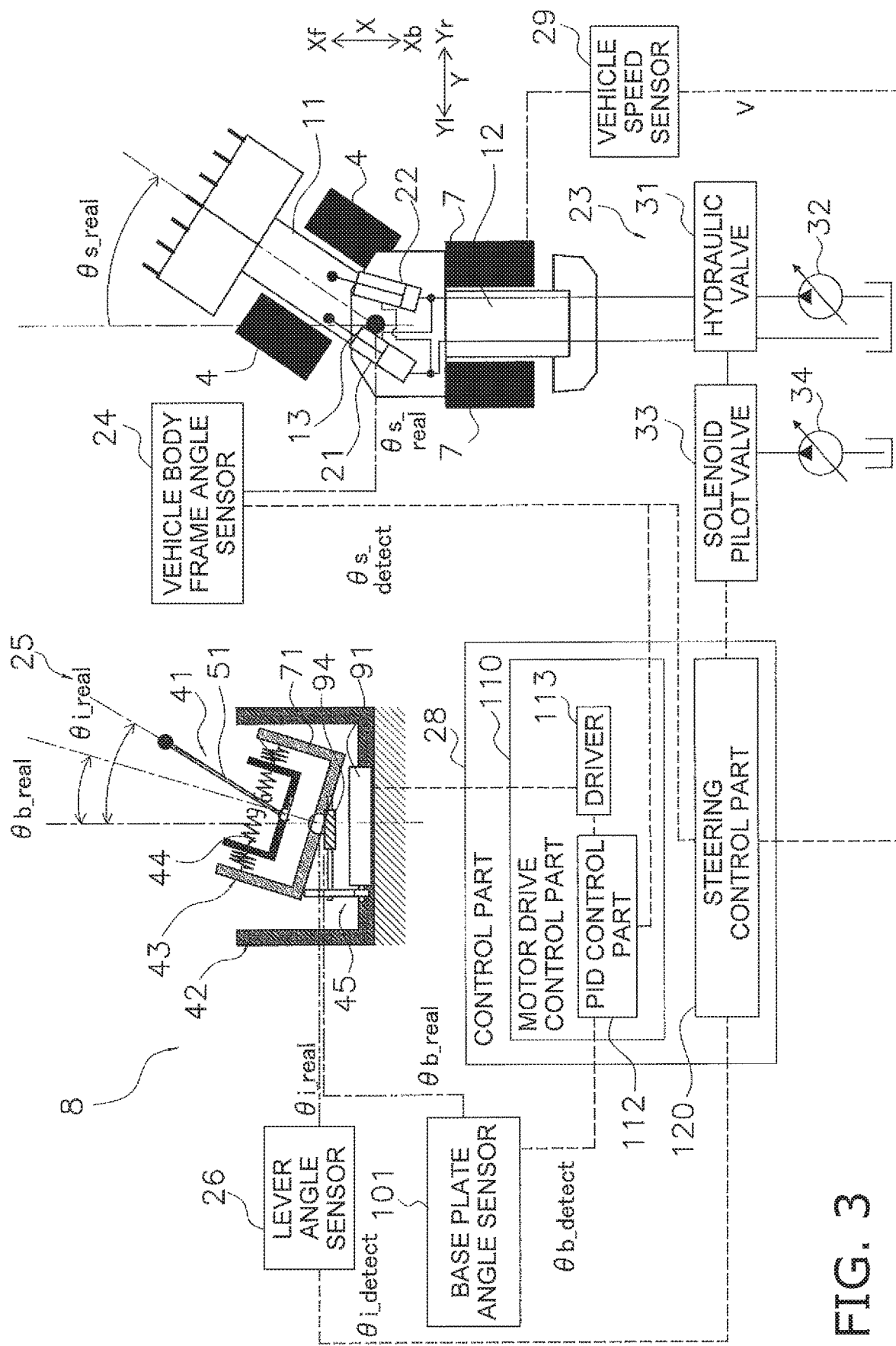
FIG. 3 is a configuration view illustrating a steering operating device in FIG. 1.

FIG. 3 is a configuration view illustrating the steering operating device 8. The steering operating device 8 of the present embodiment has the pair of steering cylinders 21 and 22, a steering hydraulic circuit 23, a vehicle body frame angle sensor 24, an operating unit 25, a lever angle sensor 26, a base plate angle detecting unit 27 (see FIG. 4A) provided with a base plate angle sensor 101, a control part 28, and a vehicle speed sensor 29. In FIG. 3, the transmission of signals on the basis of electricity is represented by the dotted lines, and transmission on the basis of hydraulics is represented by solid lines. Additionally, detection by sensors is represented by one dot chain lines. The operating unit 25 is illustrated schematically in FIG. 3. The vehicle body frame angle sensor 24 corresponds to an example of the actual steering angle detecting part.

(1-2-1. Steering Cylinder)

The pair of steering cylinders 21 and 22 are driven by hydraulic pressure. The pair of steering cylinders 21 and 22 are arranged side by side on the left and right sides in the vehicle width direction with the coupling shaft part 13 interposed therein. The steering cylinder 21 is arranged on the left side of the coupling shaft part 13. The steering cylinder 22 is arranged on the right side of the coupling shaft part 13. One end of each of the steering cylinders 21 and 22 is attached to the front frame 11 and the other end each is attached to the rear frame 12.

When the steering cylinder 21 extends and the steering cylinder 22 contracts due to hydraulic pressure from the below mentioned steering hydraulic circuit 23, an actual vehicle body frame angle $\theta s\_real$ is changed and the vehicle turns to the right. When the steering cylinder 21 contracts and the steering cylinder 22 extends due to hydraulic pressure from the steering hydraulic circuit 23, the actual vehicle body frame angle $\theta s\_real$ is changed and the vehicle turns to the left. In the present embodiment, the actual vehicle body frame angle $\theta s\_real$ when the front frame 11 and the rear frame 12 are arranged in the front-back direction is set to zero, the right side is a positive value, and the left side is a negative value. The actual vehicle body frame angle $\theta s\_real$ corresponds to an example of the actual steering angle.

(1-2-2. Steering Hydraulic Circuit)

The steering hydraulic circuit 23 is a hydraulic circuit for adjusting the flow rate of the oil supplied to the steering cylinders 21 and 22. The steering hydraulic circuit 23 has a hydraulic valve 31, a main pump 32, a solenoid pilot valve 33, and a pilot pump 34.

The hydraulic valve 31 is a flow rate adjustment valve for adjusting the flow rate of the oil supplied to the steering cylinders 21 and 22 in response to an inputted pilot pressure. A spool valve, for example, is used as the hydraulic valve 31. The main pump 32 supplies hydraulic fluid for actuating the steering cylinders 21 and 22 to the hydraulic valve 31. The hydraulic valve 31 has an obturating element (not illustrated) that is capable of moving between a left steering position, a neutral position, and a right steering position. When the obturating element is arranged in the left steering position in the hydraulic valve 31, the steering cylinder 21 contracts and the steering cylinder 22 extends, whereby the actual vehicle body frame angle $\theta s\_real$ decreases and the vehicle body turns to the left. When the obturating element is arranged in the right steering position in the hydraulic valve 31, the steering cylinder 22 contracts and the steering cylinder 21 extends, whereby the actual vehicle body frame angle $\theta s\_real$ increases and the vehicle body turns to the right. When the obturating element is arranged in the neutral position in the hydraulic valve 31, the actual vehicle body frame angle $\theta s\_real$ does not change.

The solenoid pilot valve 33 corresponds to an example of a control valve and is a flow rate adjustment valve for adjusting the flow rate of the pilot hydraulic pressure supplied to the hydraulic valve 31 in response to a command from the control part 28. A spool valve, for example, is used as the solenoid pilot valve 33. The pilot pump 34 supplies hydraulic fluid for actuating the hydraulic valve 31 to the solenoid pilot valve 33. The solenoid pilot valve 33 is, for example, a spool valve or the like and is controlled in accordance with commands from the control part 28.

As described above, the pilot pressure from the solenoid pilot valve 33 is controlled in response to commands from the control part 28, whereby the hydraulic valve 31 is controlled and the steering cylinders 21 and 22 are controlled.

(1-2-3. Vehicle Body Frame Angle Sensor 24)

The vehicle body frame angle sensor 24 detects the actual vehicle body frame angle $\theta s\_real$ as a detection value $\theta s\_detect$ (also referred to as the vehicle body frame angle) of the vehicle body frame angle. The vehicle body frame angle sensor 24 is arranged in the proximity to the coupling shaft part 13 arranged between the steering cylinders 21 and 22. The vehicle body frame angle sensor 24 is configured, for example, by a potentiometer, and the detected detection value $\theta s\_detect$ of the vehicle body frame angle is sent to the control part 28 as a detection signal.

A cylinder stroke sensor for detecting the cylinder stroke may be provided on each of the steering cylinders 21 and 22 and the detection values of the cylinder stroke sensors may be sent to the control part 28 and the detection value $\theta s\_detect$ of the vehicle body frame angle may be detected.

(1-2-4. Operating Unit 25)

Figure 4A:
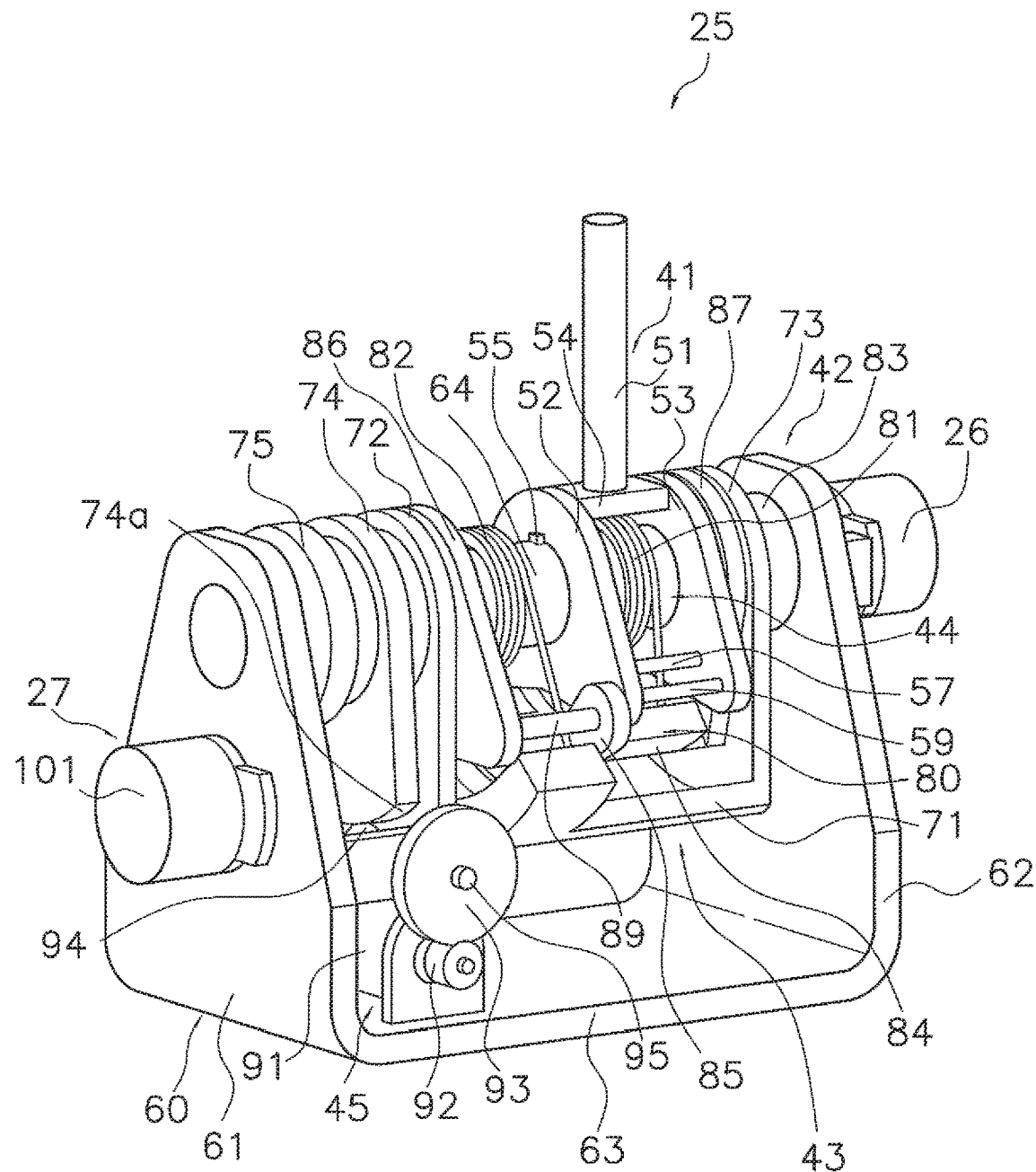
FIG. 4A is a perspective view illustrating an operating unit of FIG. 3.
Figure 4B:
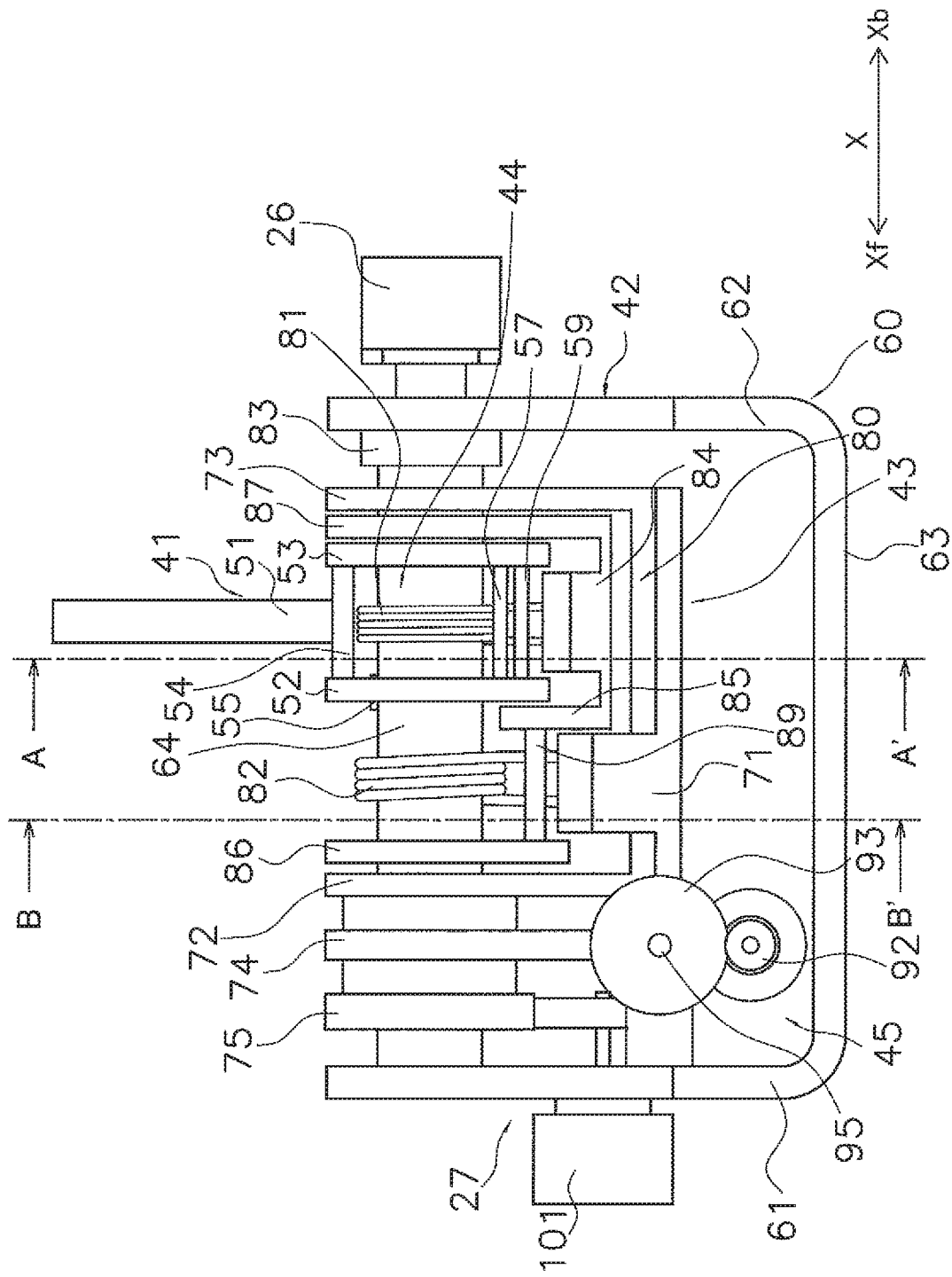
FIG. 4B is a side view illustrating the operating unit of FIG. 4A.
Figure 4C:
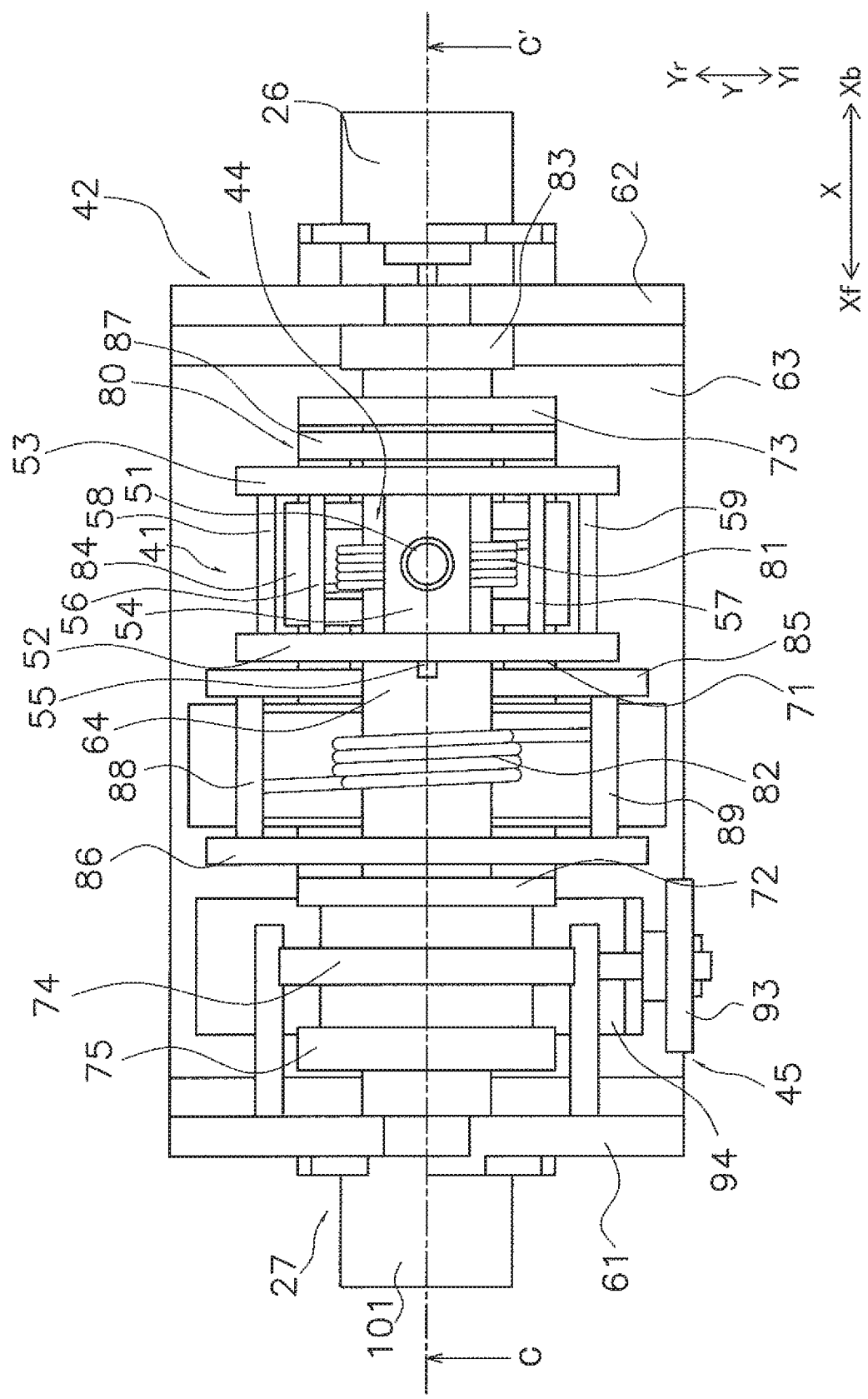
FIG. 4C is a plan view illustrating the operating unit of FIG. 4A.
Figure 4D:
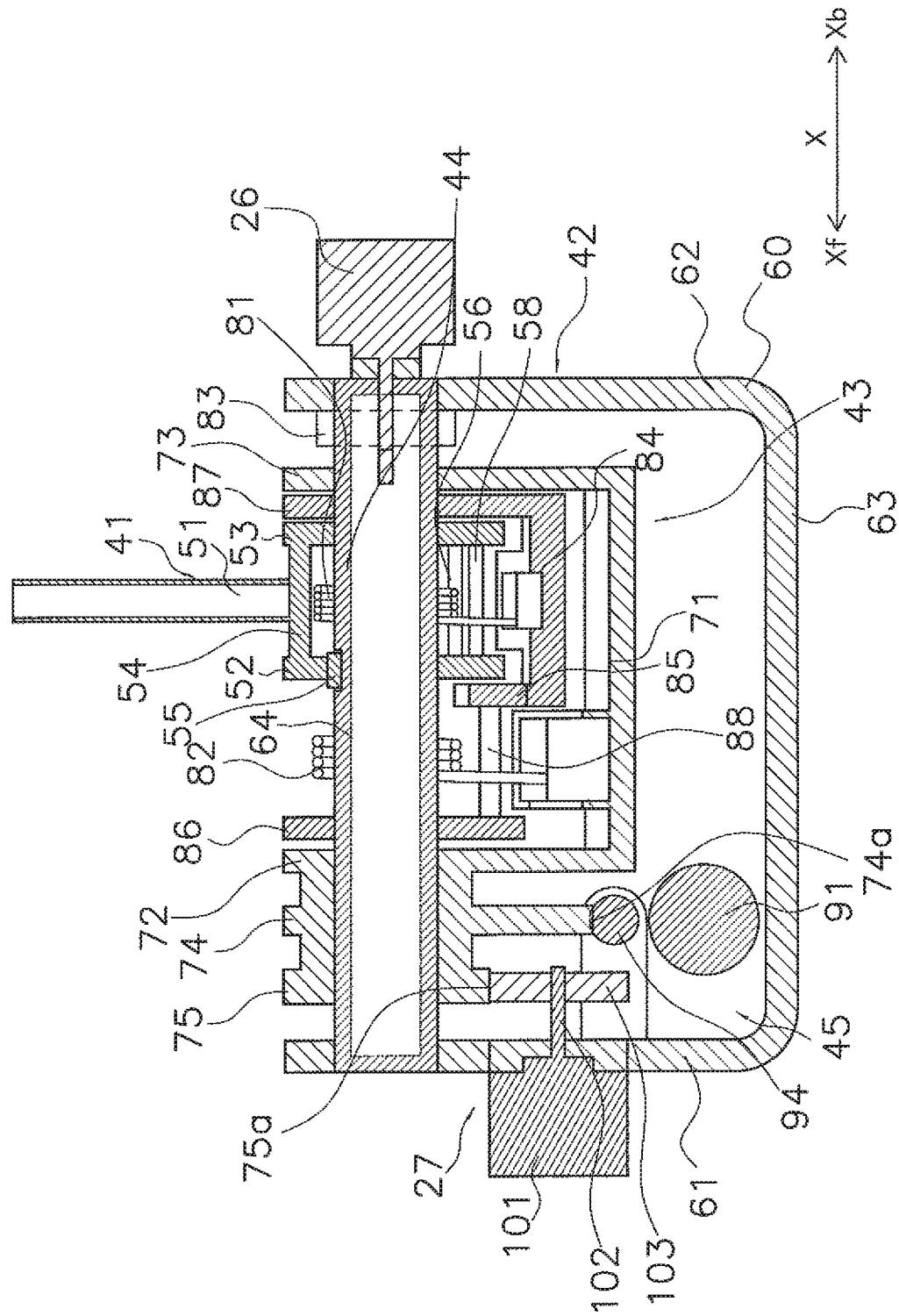
FIG. 4D is a reference arrow cross-sectional view along line C to C' in FIG. 4C.
Figure 4E:
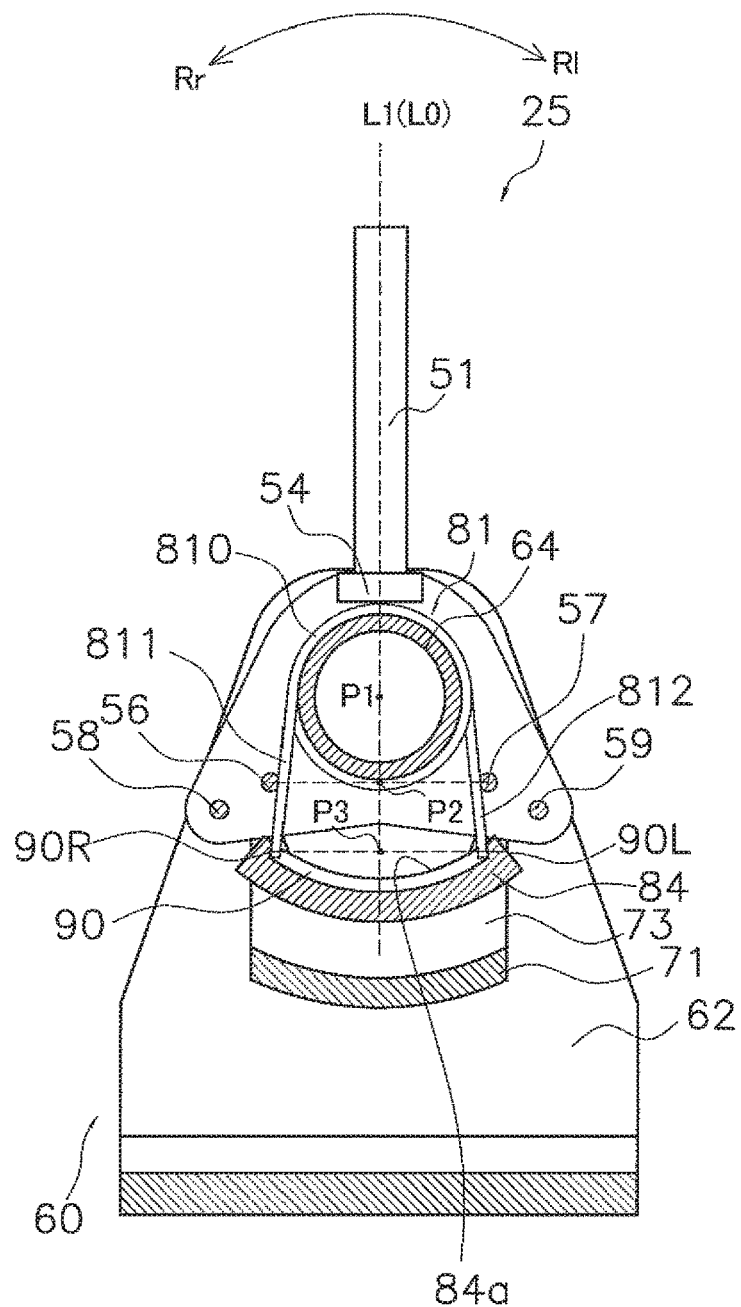
FIG. 4E is a reference arrow cross-sectional view along line A to A' in FIG. 4B.
Figure 4F:
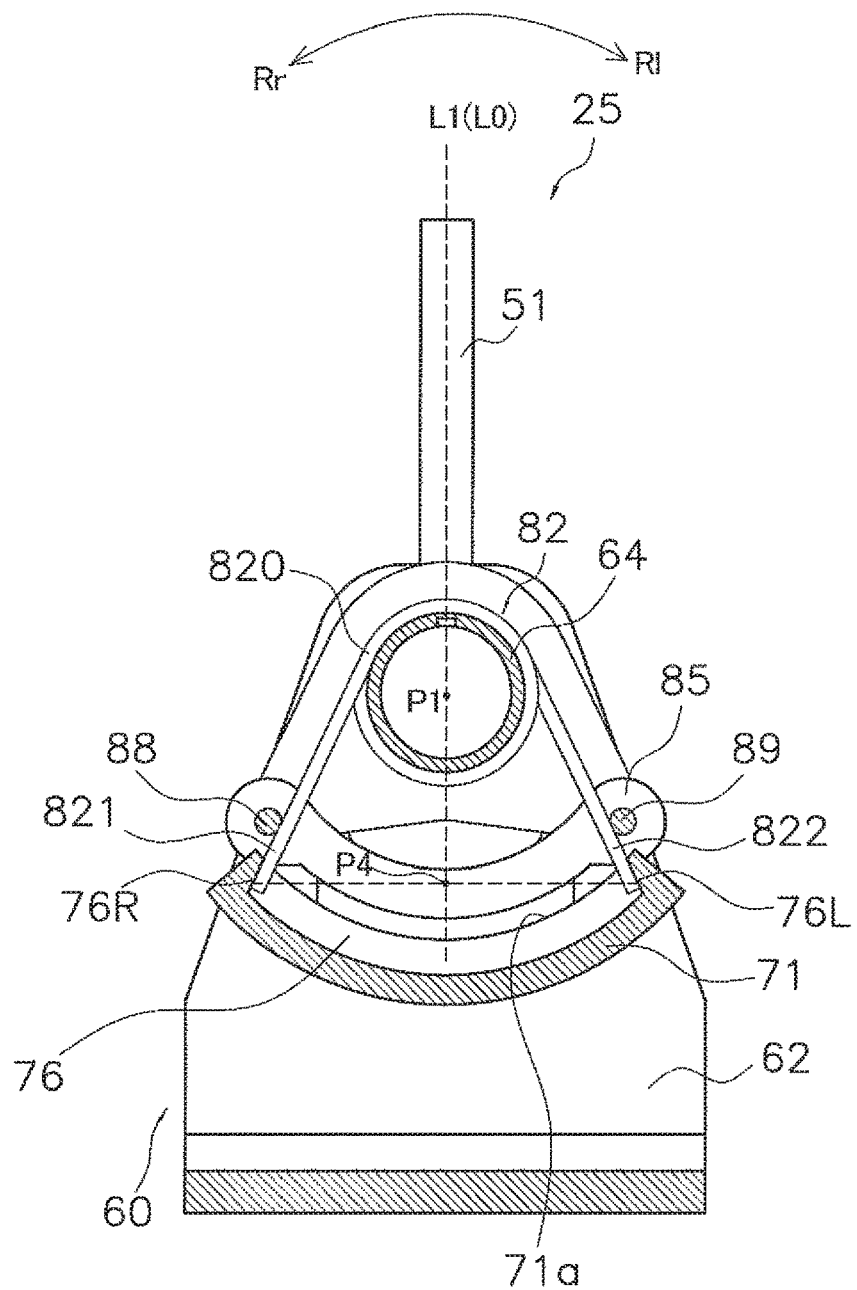
FIG. 4F is a reference arrow cross-sectional view along line B to B' in FIG. 4B.

FIG. 4A is a perspective view of the operating unit 25. FIG. 4B is a side view of the operating unit 25. FIG. 4C is a plan view of the operating unit 25. FIG. 4D is a reference arrow cross-sectional view along line C to C' in FIG. 4C. FIG. 4E is a reference arrow cross-sectional view along line A to A' in FIG. 4B. FIG. 4F is a reference arrow cross-sectional view along line B to B' in FIG. 4B.

As illustrated in FIG. 4A, the operating unit 25 is provided with the lever unit 41, a support part 42, a base part 43, a biasing part 44, and a position adjusting part 45.

The lever unit 41 is operated by an operator. The support part 42 is fixed to the console box 20 and rotatably supports the joystick lever 51. The base part 43 is rotatably supported by the support part 42. The biasing part 44 biases the lever unit 41 to a predetermined position with respect to the base part 43. The position adjusting part 45 adjusts the rotating position of the base part 43 on the basis of the detection value θs_detect of the vehicle body frame angle.

(a. Lever Unit 41)

As illustrated in FIG. 2, the lever unit 41 is arranged at a front end part of the console box 20.

As illustrated in FIG. 4B, the lever unit 41 has the joystick lever 51, a pair of coupling plates 52 and 53, a connecting part 54, and a key 55 (see FIG. 4D).

The joystick lever 51 is a rod-like member and is operated by the operator. The pair of coupling plates 52 and 53 are coupled to the joystick lever 51 and a rotating shaft 64 (described below) of the support part 42, and transmit the rotation of the joystick lever 51 to the rotating shaft 64.

Each of the pair of coupling plates 52, 53 is arranged such that the plate-like main surface is substantially perpendicular to the front-back direction X. The pair of coupling plates 52 and 53 are arranged facing each other with a predetermined interval opened therebetween in the front-back direction X.

The connecting part 54 is arranged between the pair of coupling plates 52 and 53 so as to join the upper end parts of the pair of coupling plates 52 and 53. The lower end of the joystick lever 51 is fixed to the upper surface of the connecting part 54. The pair of coupling plates 52 and 53 have through-holes respectively formed therein and the rotating shaft 64 is inserted into the through-holes of the coupling plates 52 and 53. As illustrated in FIG. 4D, the key 55 is fitted between a recessed part formed at the edge of the through-hole of the coupling plate 52 and a groove formed in the rotating shaft 64, and is a member for transmitting the rotation of the coupling plate 52 to the rotating shaft 64. The rotating shaft 64 is rotatably supported by the support part 42.

As illustrated in FIG. 4A and FIG. 4E, rod-like connecting members 56 and 57 are provided that join the coupling plates 52 and 53. The connecting member 56 and the connecting member 57 are arranged further to the outside of the rotating shaft 64 in the vehicle width direction. The connecting member 56 is arranged further to the right direction Yr side of the rotating shaft 64 in the vehicle width direction Y, and the connecting member 57 is arranged further to the left direction Yl side of the rotating shaft 64 in the vehicle width direction Y.

Figure 6A:
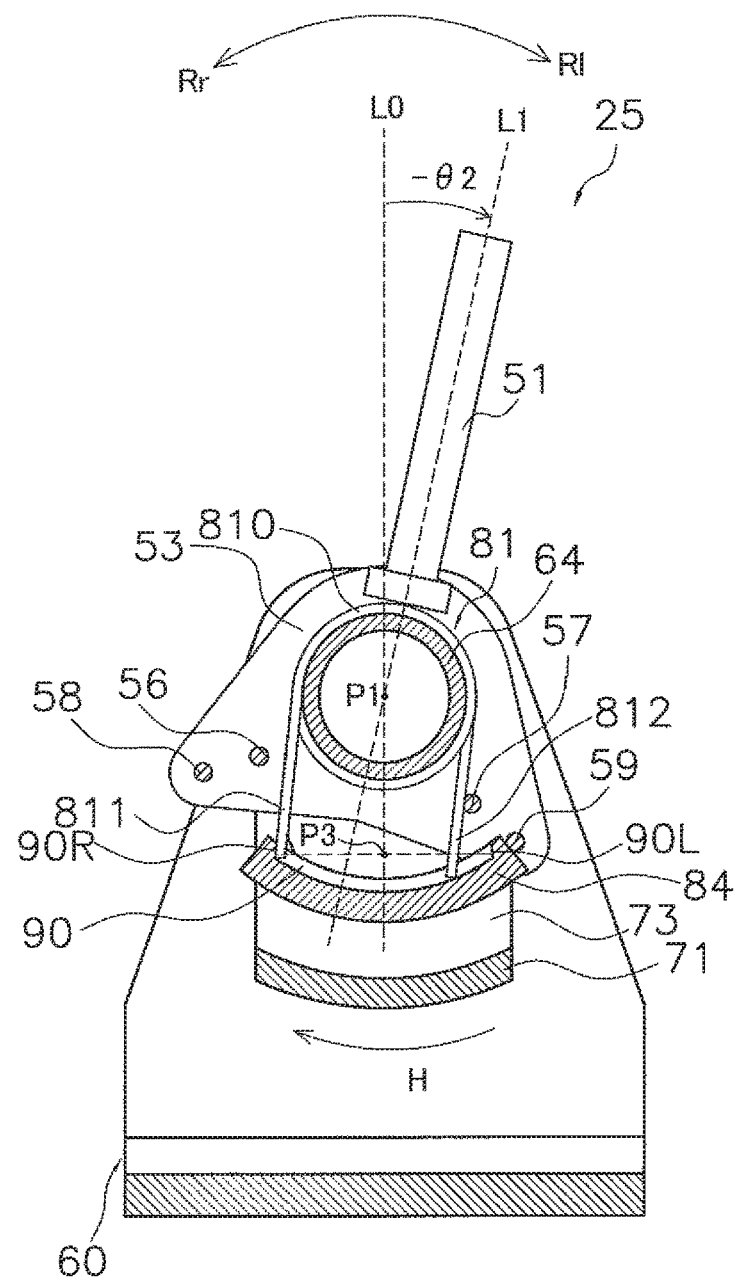
FIG. 6A is a cross-sectional view illustrating a state of a joystick lever being rotated leftward from the state illustrated in FIG. 4E.

As illustrated in FIG. 6A below, when the joystick lever 51 is rotated by the operator, the pair of coupling plates 52 and 53 rotate with the connecting part 54 and the rotating shaft 64 rotates by means of the key 55.

In addition, the lever unit 41 is provided with abutting members 58 and 59. The abutting members 58 and 59 abut against a holder plate 84 of a below mentioned holder part 80 and cause the holder part 80 to rotate. The abutting members 58 and 59 are rod-like members that join the coupling plates 52 and 53. The abutting members 58 and 59 are arranged further to the outside than the connecting members 56 and 57. Specifically, the abutting member 58 is arranged on the right direction Yr side and below the connecting member 56 and the abutting member 59 is arranged on the left direction Yl side and below the connecting member 57.

(b. Support Part 42)

The support part 42 rotatably supports the lever unit 41. The support part 42 is fixed, for example, to the inside of the console box 20 illustrated in FIG. 2. As illustrated in FIG. 4A, the support part 42 has a support frame 60 and the rotating shaft 64.

As illustrated in FIG. 4B and FIG. 4D, the support frame 60 is a member formed in a U-shape in a side surface view. The support frame 60 has a pair of shaft support parts 61 and 62 that face each other in the front-back direction X, and a coupling part 63 that joins the lower ends of the shaft support part 61 and the shaft support part 62. The shaft support part 61 and the shaft support part 62 each have through-holes formed therein in the front-back direction X.

The rotating shaft 64 is rotatably inserted into the through-holes formed in the shaft support parts 61 and 62. The rotating shaft 64 is arranged along the front-back direction X in a substantially horizontal direction.

(c. Base Part 43)

The base part 43 is rotatably supported by the support part 42. As illustrated in FIG. 4A, the base part 43 has a base plate 71, a pair of support plates 72 and 73, a transmission gear part 74, and a detection gear part 75.

The base plate 71 corresponds to an example of a rotating part and is a plate-like member disposed so as to cover the pair of coupling plates 52 and 53 from below. The base plate 71 is curved so as to protrude downward when seen along the front-back direction X (see FIG. 4E).

As illustrated in FIG. 4B and FIG. 4C, the pair of support plates 72 and 73 rotatably support the base plate 71 on the rotating shaft 64. The pair of support plates 72 and 73 are arranged so as to sandwich the coupling plates 52 and 53 from the outside in the front-back direction X. The support plate 72 is arranged on the forward direction Xf side of the coupling plate 52 and the support plate 73 is arranged on the rearward direction Xb side of the coupling plate 53.

The support plates 72 and 73 have through-holes formed therein in the front-back direction X, and the rotating shaft 64 is inserted into the through-holes. In this way, the support plates 72 and 73 are rotatably arranged with respect to the rotating shaft 64.

As illustrated in FIG. 4A and FIG. 4F, the lower ends of the support plates 72 and 73 are curved so as to protrude downward and the base plate 71 is arranged so as to join the lower end of the support plate 72 and the lower end of the support plate 73. A groove 76 is formed in the width direction Y on an upper surface 71a of the base plate 71 as illustrated in FIG. 4F. The end on the right direction Yr side in the width direction Y of the groove 76 is represented by 76R, and the end on the left direction Yl side is represented by 76L.

The transmission gear part 74 transmits the driving power of the position adjusting part 45 to the base plate 71. As illustrated in FIG. 4D, the transmission gear part 74 is arranged on the front side of the support plate 72 and is coupled to the support plate 72. The transmission gear part 74 has a through-hole formed therein in the front-back direction X, and the rotating shaft 64 is inserted into the through-hole. As a result, the transmission gear part 74 is configured so as to be able to rotate with respect to the rotating shaft 64. As illustrated in FIG. 4A, a lower end surface 74a of the transmission gear part 74 is formed so as to be curved and protrude downward and a gear shape is formed on the lower end surface 74a. As illustrated in FIG. 4D, the lower end surface 74a engages with a worm gear 94 of the below mentioned position adjusting part 45.

The detection gear part 75 is used for detecting the position of the base plate 71. As illustrated in FIG. 4D, the detection gear part 75 is arranged on the forward direction Xf side of the transmission gear part 74 and is coupled to the transmission gear part 74. The detection gear part 75 has a through-hole formed therein in the front-back direction X, and the rotating shaft 64 is inserted into the through-hole. As a result, the detection gear part 75 is configured so as to be able to rotate with respect to the rotating shaft 64. A lower end surface 75a of the detection gear part 75 is formed so as to be curved and protrude downward and a gear shape is formed on the lower end surface 75a. As illustrated in FIG. 4D, the lower end surface 75a engages with a gear 103 coupled to the below mentioned base plate angle sensor 101.

The base part 43 is able to rotate with respect to the rotating shaft 64 due to the driving power of the position adjusting part 45 (see FIG. 3 and FIG. 9B below). When the transmission gear part 74 rotates with respect to the rotating shaft 64 due to the driving power of the position adjusting part 45, the support plates 72 and 73 and the base plate 71 coupled to the transmission gear part 74 also rotate. At this time, the detection gear part 75 coupled to the transmission gear part 74 rotates and the rotation position of the base plate 71 is detected by the base plate angle sensor 101 via the detection gear part 75.

(d. Biasing Part 44)

The biasing part 44 biases the lever unit 41 to a predetermined position with respect to the base plate 71. Specifically, the biasing part 44 biases the lever unit 41 so that the joystick lever 51 is positioned in the center of the base plate 71 in the width direction Y as illustrated in FIG. 4F. As illustrated in FIG. 4F, the predetermined position is the position where a straight line L1 that passes through the center of the joystick lever 51 in the front view passes through a midpoint P4 of the groove 76 of the base plate 71 between the right end 76R and the left end 76L of the groove 76.

Consequently, a counterforce can be produced when the operator operates the joystick lever 51 toward the left or right from the predetermined position with respect to the base plate 71, and an operational feel is imparted to the operator.

As illustrated in FIG. 4B, the biasing part 44 has the holder part 80, a first spring member 81, a second spring member 82, and a damper 83.

The holder part 80 is provided so as to be able to rotate with respect to the rotating shaft 64. The holder part 80 is arranged so as to cover the lever unit 41 from below. The holder part 80 is arranged between the base part 43 and the lever unit 41 as seen in a side view. The holder part 80 is arranged on the inside of the base part 43 and on the outside of the lever unit 41.

The holder part 80 has the holder plate 84, a coupling part 85, support plates 86 and 87, and the connecting members 88 and 89. As illustrated in FIG. 4E, the holder plate 84 is a plate-like member that is curved so as to protrude downward and is arranged so as to cover the lever unit 41 from below. The holder plate 84 is arranged on the upper side of the base plate 71. As illustrated in FIG. 4E, the holder plate 84 has a groove 90 formed in the width direction Y on an upper surface 84a. The end on the right direction Yr side in the width direction Y of the groove 90 is represented by 90R, and the end on the left direction Yl side is represented by 90L.

As illustrated in FIG. 4D, the coupling part 85 is a plate-like member formed so as to extend upward from the end on the forward direction Xf of the holder plate 84 and is arranged further to the forward direction Xf side than the coupling plate 52.

As illustrated in FIGS. 4B and 4C, the support plates 86 and 87 rotatably support the holder plate 84 on the rotating shaft 64. The pair of support plates 86 and 87 are arranged so as to sandwich the coupling plates 52 and 53 from the outside in the front-back direction X. The support plate 86 is arranged on the forward direction Xf side of the coupling plate 52 and on the rearward direction Xb side of the support plate 72, and the support plate 87 is arranged on the rearward direction Xb side of the coupling plate 53 and on the forward direction Xf side of the support plate 73.

As illustrated in FIG. 4C, the connecting members 88 and 89 are rod-like members and connect the coupling part 85 and the support plate 86 to each other. The connecting members 88 and 89 are arranged parallel to the rotating shaft 64. As illustrated in FIG. 4F, the connecting member 88 is arranged at the end on the right direction Yr side of the coupling part 85 and the support plate 86, and the connecting member 89 is arranged at the end on the left direction Yl side of the coupling part 85 and the support plate 86.

FIG. 4E illustrates a state (state of being arranged in the center position) in which the holder plate 84 is not rotated with respect to the support frame 60 and a midpoint P3 between the end 90R and the end 90L of the groove 90 of the holder plate 84 is arranged on a vertical straight line L0 that passes through the rotating shaft 64.

The first spring member 81 is a coil spring and, as illustrated in FIG. 4A, is arranged on the circumference of the rotating shaft 64.

Consequently, a counterforce can be produced when the operator operates the joystick lever 51 toward the left or right from the center position, and an operational feel can be imparted to the operator.

The rotating shaft 64 is inserted into the first spring member 81. The first spring member 81 is arranged between the pair of the coupling plate 52 and the coupling plate 53.

As illustrated in FIG. 4E, the first spring member 81 has a coil part 810, a first end part 811, and a second end part 812. The rotating shaft 64 is inserted through the coil part 810. The first end part 811 and the second end part 812 extend downward from the coil part 810 and are arranged between the connecting member 56 and the connecting member 57.

While the joystick lever 51 is arranged in the predetermined position, the first end part 811 is arranged in a state of being in contact with the connecting member 56 on the left direction Yl side of the connecting member 56. In addition, the lower end of the first end part 811 is in contact with the right end 90R of the groove 90 of the holder plate 84. The second end part 812 is arranged in a state of being in contact with the connecting member 57 on the right direction Yr side of the connecting member 57. In addition, the lower end of the second end part 812 is in contact with the left end 90L of the groove 90.

The first spring member 81 exerts an elastic force so as to push the connecting member 56 and the right end 90R to the right direction Yr side and push the connecting member 57 and the left end 90L to the left direction Yl side.

The second spring member 82 is a coil spring and is arranged on the circumference of the rotating shaft 64. As illustrated in FIG. 4A, the second spring member 82 is arranged between the coupling plate 52 (more specifically, the coupling part 85) and the support plate 86.

As illustrated in FIG. 4F, the second spring member 82 has a coil part 820, a first end part 821, and a second end part 822. The rotating shaft 64 is inserted through the coil part 820. The first end part 821 and the second end part 822 extend downward from the coil part 820, and are arranged between the connecting member 88 and the connecting member 89.

FIG. 4F illustrates a state in which the base plate 71 is not rotated with respect to the support frame 60 and the midpoint P4 between the end 76R and the end 76L of the groove 76 of the base plate 71 is arranged on the vertical straight line L0 that passes through the rotating shaft 64.

In the state illustrated in FIG. 4F, the joystick lever 51 is also not rotated and the first end part 821 is arranged in a state of being in contact with the connecting member 88 on the left direction Yl side of the connecting member 88. In addition, the lower end of the first end part 821 is in contact with the right end 76R of the groove 76 of the base plate 71. The second end part 822 is arranged in a state of being in contact with the connecting member 89 on the right direction Yr side of the connecting member 89. In addition, the lower end of the second end part 822 is in contact with the left end 76L of the groove 76.

The second spring member 82 exerts an elastic force so as to push the connecting member 88 and the right end 76R to the right direction Yr side and push the connecting member 89 and the left end 76L to the left direction Yl side.

As illustrated in FIG. 4A, the damper 83 is provided between the rotating shaft 64 and the shaft support part 62. Resistance is produced in correspondence to the angular speed of the joystick lever 51 by the damper 83.

(e. Position Adjusting Part 45)

The position adjusting part 45 adjusts the position of the base plate 71 on the basis of a detection value of the vehicle body frame angle sensor 24. As illustrated in FIG. 4A and FIG. 4B, the position adjusting part 45 is arranged on the upper surface of the coupling part 63 and has an electric motor 91, an output gear 92, a speed reduction gear 93, and the worm gear 94.

The electric motor 91 is driven by commands from the control part 28. As illustrated in FIG. 4D, the worm gear 94 engages with the lower end surface 74*a* of the transmission gear part 74. The electric motor 91 transmits a driving force to the transmission gear part 74 via the output gear 92, the speed reduction gear 93, and the worm gear 94.

According to this configuration, the base plate 71 rotates due to the driving force of the electric motor 91.

(1-2-5. Lever Angle Sensor 26)

The lever angle sensor 26 is configured, for example, as a potentiometer and detects an actual lever angle θi_real, which is the rotation angle of the rotating shaft 64 with respect to the support part 42, as a detection value θi_detect of the lever angle. As illustrated in FIG. 4D, the lever angle sensor 26 is arranged on the outside (rearward direction Xb side) of the shaft support part 62 of the support part 42.

The detection value θi_detect of the lever angle detected by the lever angle sensor 26 is sent to the control part 28 as a detection signal. The actual lever angle θi_real represents the rotation angle from the center position of the joystick lever 51 with respect to the support part 42. The center position of the joystick lever 51 with respect to the support part 42 is the position where the straight line L1 along the longitudinal direction of the joystick lever 51 as illustrated in FIG. 4E matches the straight line L0 arranged in the vertical direction passing through the rotating shaft 64. The actual lever angle θi_real is the rotation angle of the straight line L1 from the vertical straight line L0. The angle when the joystick lever 51 is rotated rightward from the center position is a positive value and the angle when the joystick lever 51 is rotated leftward from the center position is a negative value.

(1-2-6. Base Plate Angle Detecting Unit 27)

As illustrated in FIG. 4D, the base plate angle detecting unit 27 has the base plate angle sensor 101, a detecting shaft 102, and a gear 103.

The base plate angle sensor 101 is configured, for example, as a potentiometer and detects an actual base plate angle θb_real, which is the rotation angle of the base plate 71 with respect to the support part 42, as a detection value θb_detect of the base plate angle. The base plate angle sensor 101 is fixed to the outside of the shaft support part 61.

The detecting shaft 102 is a shaft the rotation angle of which is detected by the base plate angle sensor 101. The detecting shaft 102 passes through the shaft support part 61 from the base plate angle sensor 101 and extends to the inside the shaft support part 61.

The gear 103 is fixed to the detecting shaft 102. The gear 103 engages with the lower end surface 75*a* of the detection gear part 75 of the base part 43.

When the base part 43 rotates due to the position adjusting part 45, the detection gear part 75 similarly rotates whereby the detecting shaft 102 also rotates via the gear 103. The rotation of the detecting shaft 102 is detected by the base plate angle sensor 101 and the rotation angle with respect to the support part 42 of the base plate 71 is detected.

The detection value θb_detect of the base plate angle detected by the base plate angle sensor 101 is sent to the control part 28 as a detection signal. The actual base plate angle θb_real represents the rotation angle of the base plate 71 from the center position with respect to the support part 42. In addition, the center position of the base plate 71 with respect to the support part 42 is the position where a straight line passing through the midpoint P4 between the right end 76R and the left end 76L of the groove 76 of the base plate 71 and the center P1 of the rotating shaft 64 is arranged on the vertical straight line L0. The actual base plate angle θb_real is the rotation angle of the straight line passing through the midpoint P4 and the center P1, from the vertical straight line L0. The angle when the base plate 71 is rotated rightward from the center position is a positive value and the angle when the base plate 71 is rotated leftward from the center position is a negative value. In FIG. 4E and FIG. 4F, clockwise is rotation leftward (arrow Rl) and anticlockwise is rotation rightward (arrow Rr).

(1-2-7. Control Part 28 and Vehicle Speed Sensor 29)

The control part 28 has a CPU and a memory and the like and executes the functions explained below. As illustrated in FIG. 3, the control part 28 has a motor drive control part 110 and a steering control part 120. The vehicle speed sensor 29 detects a vehicle speed V and transmits the vehicle speed V to the control part 28 as a detection signal.

The motor drive control part 110 is an example of a position adjustment control part and controls the electric motor 91 of the position adjusting part 45 and adjusts the rotation angle of the base plate 71 on the basis of the detection value θs_detect of the vehicle body frame angle detected by the vehicle body frame angle sensor 24. The motor drive control part 110 has a PID control part 112 and a driver 113. The PID control part 112 determines a control parameter so as to match the detection value θb_detect of the base plate angle and the detection value θs_detect of the vehicle body frame angle on the basis of a difference between the detection value θs_detect of the vehicle body frame angle and the detection value θb_detect of the base plate angle detected by the base plate angle sensor 101, and transmits the control parameter to the driver 113. The driver 113 controls the electric motor 91 on the basis of the received control parameter. As a result, the rotation angle of the base plate 71 can be made to match the actual vehicle body frame angle θs_real.

The steering control part 120 controls the solenoid pilot valve 33 on the basis of the detection value θi_detect of the lever angle detected by the lever angle sensor 26, the detection value θs_detect of the vehicle body frame angle detected by the vehicle body frame angle sensor 24, and the vehicle speed V, and changes the actual vehicle body frame angle θs_real.

The control part 28 may also control the main pump 32 and the pilot pump 34, or the like.

The transmission and reception of signals between the control part 28 and the vehicle body frame angle sensor 24, the lever angle sensor 26, the base plate angle sensor 101, the vehicle speed sensor 29, the electric motor 91, and the solenoid pilot valve 33 may each be carried out wirelessly or by wire.

(1-2-8. Counterforce Produced on the Joystick Lever 51)

The counterforce produced in the joystick lever 51 by the first spring member 81 and the second spring member 82 will be explained.

A holder plate angle θh is defined because the holder plate 84 also rotates with respect to the support frame 60. The holder plate angle θh represents a rotation angle of the holder plate 84 from the center position with respect to the support part 42. As illustrated in FIG. 4E, the center position of the holder plate 84 with respect to the support part 42 is the position where the midpoint P3 between the right end 90R and the left end 90L of the groove 90 of the holder plate 84 is arranged on the vertical straight line L0. The holder plate angle θh is the rotation angle of a straight line passing the midpoint P3 and the center P1, from the vertical straight line L0. The angle when the holder plate 84 is rotated rightward from the center position is a positive value and the angle when the holder plate 84 is rotated leftward from the center position is a negative value.

Figure 5:
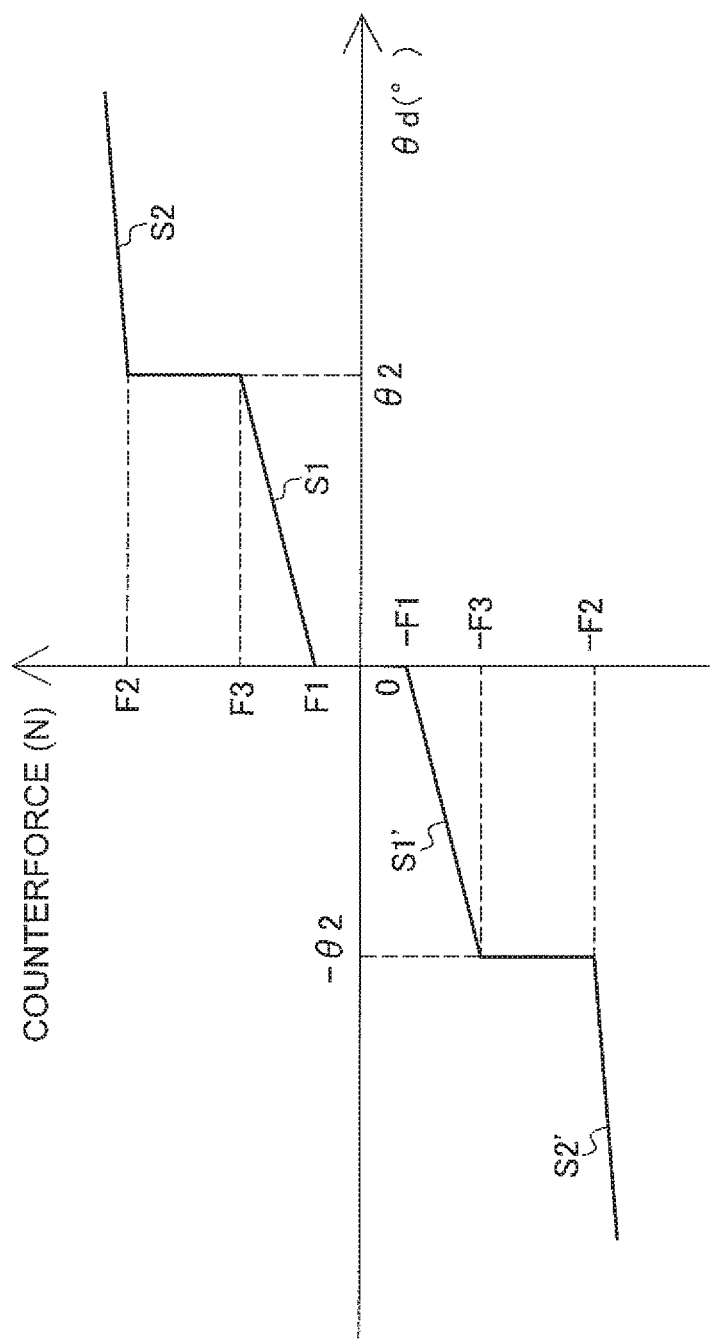
FIG. 5 illustrates a counterforce of a spring member with respect to the difference between a lever angle and a base plate angle.

FIG. 5 illustrates the relationship of the counterforces produced by the first spring member 81 and the second spring member 82 with a lever relative angle θd derived by subtracting the actual base plate angle θb_real from the actual lever angle θi_real. In FIG. 5, a θd_real that is a positive value represents a situation when the joystick lever 51 is rotated rightward with respect to the base plate 71, and a θd_real that is a negative value represents a situation when the joystick lever 51 is rotated leftward with respect to the base plate 71. In addition, a counterforce that is a positive value represents a counterforce produced toward the left and a counterforce that is a negative value represents a counterforce produced toward the right.

A spring characteristic S1 in the range of the lever relative angle θd from zero to θ2 and a spring characteristic S1' in the range of the lever relative angle θd from −θ2 to zero are the characteristics of the first spring member 81. The spring characteristics S1 and S1' of the first spring member 81 have a linear shape. The first spring member 81 begins to deflect due to a force of a counterforce F1 or greater being imparted to the joystick lever 51 and the joystick lever 51 rotating to the right direction Yr side. Moreover, the first spring member 81 begins to deflect due to a force of the counterforce F1 or greater being imparted to the joystick lever 51 and the joystick lever 51 rotating to the left direction Yl side. The counterforce grows larger in accordance with the absolute value of the lever relative angle θd growing larger when rotated to either the right or left.

A spring characteristic S2 in which the lever relative angle θd is equal to or greater than θ2 and a spring characteristic S2' in which the lever relative angle θd is equal to or less than −θ2, are the characteristics of the second spring member 82. The spring characteristics S2 and S2' of the second spring member 82 are linear. The second spring member 82 begins to deflect due to a force of a counterforce F2 or greater being imparted to the joystick lever 51 from the state of the lever relative angle θd being θ2, and the joystick lever 51 rotating to the right direction Yr side. The second spring member 82 begins to deflect due to a force of a counterforce −F2 or greater being imparted to the joystick lever 51 from the state of the lever relative angle θd being −θ2, and the joystick lever 51 rotating to the left direction Yl side. The counterforce grows larger in accordance with the absolute value of the lever relative angle θd growing larger when rotated to either the right or left.

The absolute value F2 of the counterforce at the start of deflection of the second spring member 82 is larger than the absolute value F3 of the counterforce at the lever relative angle ±θ2 of the first spring member 81. As a result, in the situation in which the operator rotates the joystick lever 51 with respect to the base plate 71, when the lever relative angle θd reaches θ2, a resistance force can suddenly be felt. The angle ±θ2 for causing the resistance to be felt in this way is also called a catch-up angle.

The positional relationship between the joystick lever 51, the holder plate 84, and the base plate 71, and the relationship in the spring characteristics are explained below.

Figure 6B:
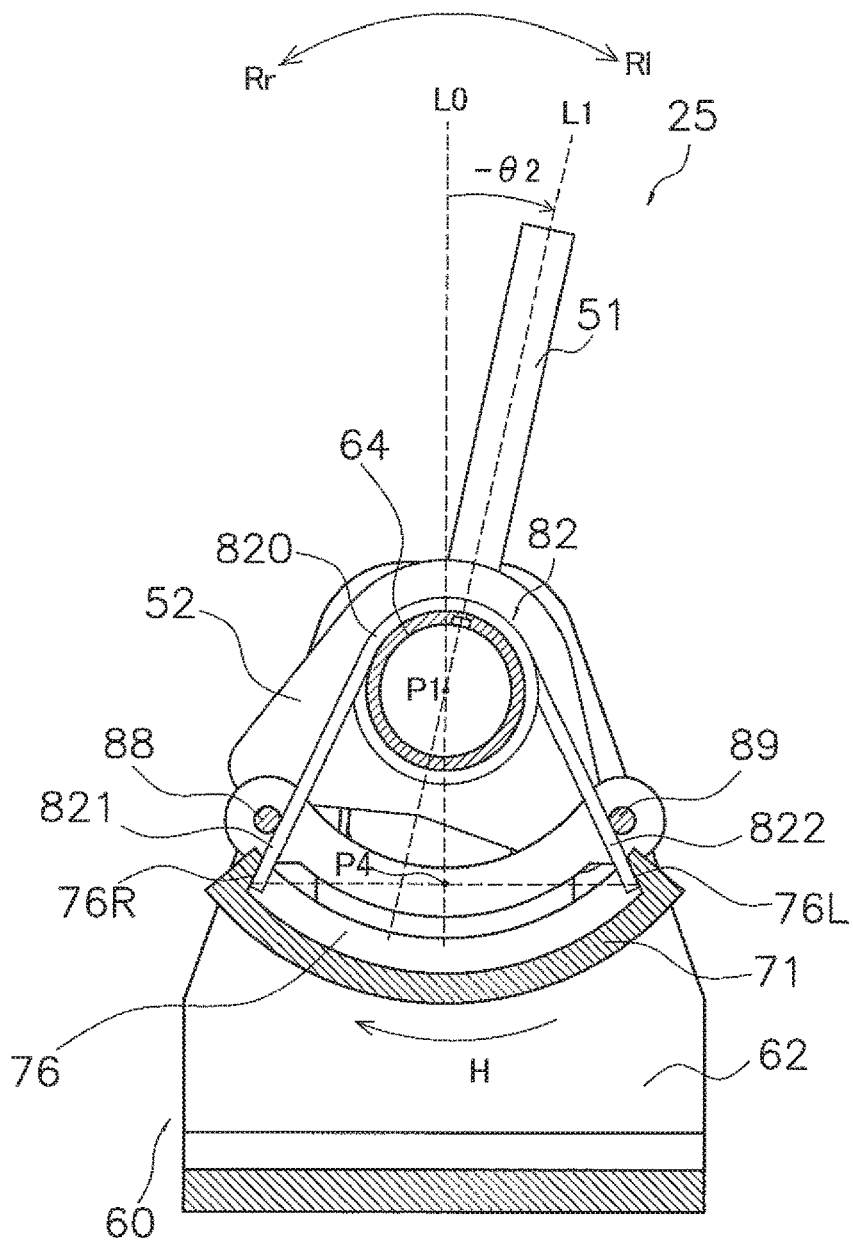
FIG. 6B is a cross-sectional view illustrating a state of the joystick lever being rotated leftward from the state illustrated in FIG. 4F.

It is assumed that the joystick lever 51 has been rotated leftward by an angle of −θ2 as illustrated in FIG. 6A and FIG. 6B from the state in which the joystick lever 51 has not rotated with respect to the support frame 60 (actual lever angle θi_real=zero), the state in which the holder plate 84 has not rotated with respect to the support frame 60 (holder plate angle θh=zero), and the state in which the base plate 71 has not rotated with respect to the support frame 60 (actual base plate angle θb_real=zero) as illustrated in FIG. 4E and FIG. 4F.

FIG. 6A is a cross-sectional view illustrating a state in which the joystick lever 51 has been rotated leftward so that the relative angle θd becomes −θ2 from the state in FIG. 4E. FIG. 6B is a cross-sectional view illustrating a state in which the joystick lever 51 has been rotated leftward so that the relative angle θd becomes −θ2 from the state in FIG. 4F.

In this situation in FIG. 6A, the second end part 812 is pushed clockwise by the connecting member 57 of the lever unit 41 and the first spring member 81 deflects while the first end part 811 of the first spring member 81 abuts against the right end 90R. Conversely, because the absolute value of the force −F2 for starting the deflection of the second spring member 82 is greater than the counterforce −F3 of the first spring member 81 at the relative angle −θ2, the second spring member 82 does not deflect as illustrated in FIG. 6B while the relative angle θd is in the range from zero to −θ2. As a result, the holder plate angle θh and the base plate angle θb stay at zero.

Next, a situation is explained in which the angle of the joystick lever 51 is less than the angle −θ2 and the joystick lever 51 is rotated further toward the left from the state of FIG. 6A to the state of FIG. 6B so that the relative angle θd becomes −θ3 (<−θ2).

Figure 7A:
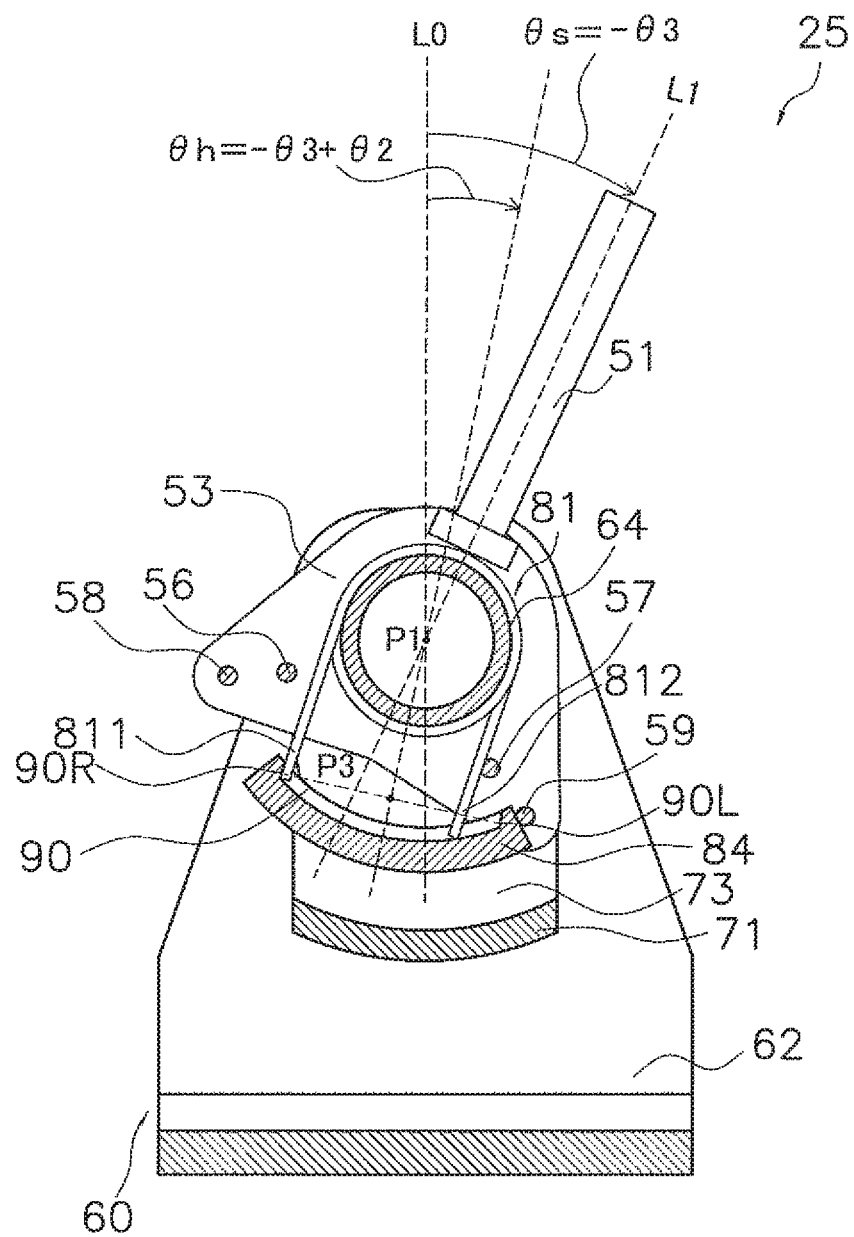
FIG. 7A is a cross-sectional view illustrating a state of the joystick lever being rotated leftward from the state illustrated in FIG. 6A.
Figure 7B:
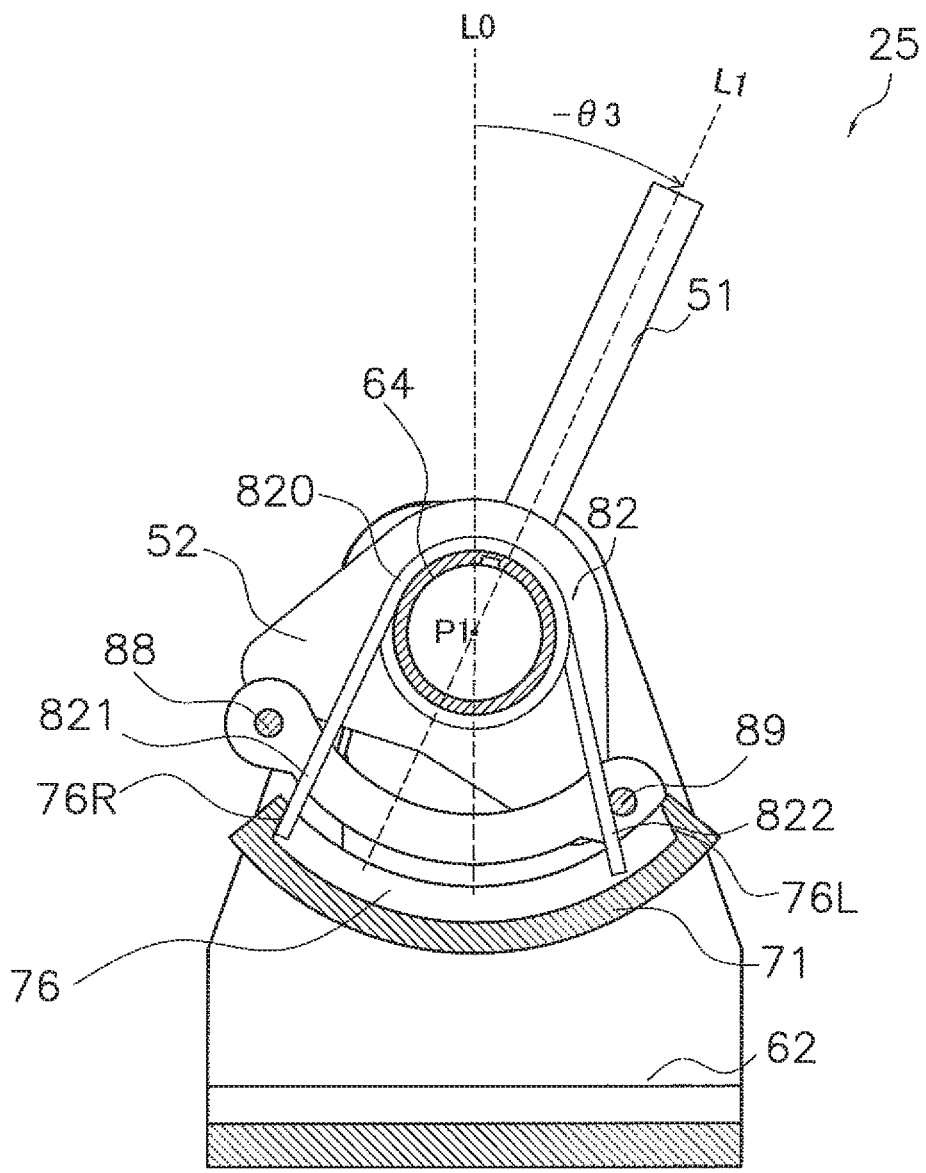
FIG. 7B is a cross-sectional view illustrating a state of the joystick lever being rotated leftward from the state illustrated in FIG. 6B.

FIG. 7A is a cross-sectional view illustrating a state in which the joystick lever 51 has been rotated leftward so that the relative angle θd becomes −θ3 from the state in FIG. 6A. FIG. 7B is a cross-sectional view illustrating a state in which the joystick lever 51 has been rotated leftward so that the relative angle θd becomes −θ3 from the state in FIG. 6B.

As illustrated in FIG. 6A, the abutting member 59 abuts the holder plate 84 from the left side while the joystick lever 51 has been rotated by the angle −θ2. When the joystick lever 51 is rotated further leftward from this state, the holder plate 84 rotates as illustrated in FIG. 7A because the abutting member 59 abuts the holder plate 84. As a result, the holder plate angle θh becomes −θ3+θ2. At this time, due to the delay of the response of the steering hydraulic circuit 23 as described below, the actual vehicle body frame angle θs_real has not changed and the actual base plate angle θb_real has not changed and is still zero. Consequently as illustrated in FIG. 7B, the second spring member 82 deflects because the second end part 822 of the second spring member 82 is pushed to the right direction Yr side by the connecting member 89 of the holder plate 84 while the first end part 821 abuts against the right end 76R of the groove 76. That is, it becomes necessary to rotate the joystick lever 51 against the counterforce of the second spring member 82 in addition to the force of the absolute value larger than the counterforce F2 in order to rotate the joystick lever 51 further to the left from the angle −θ2.

Figure 8:
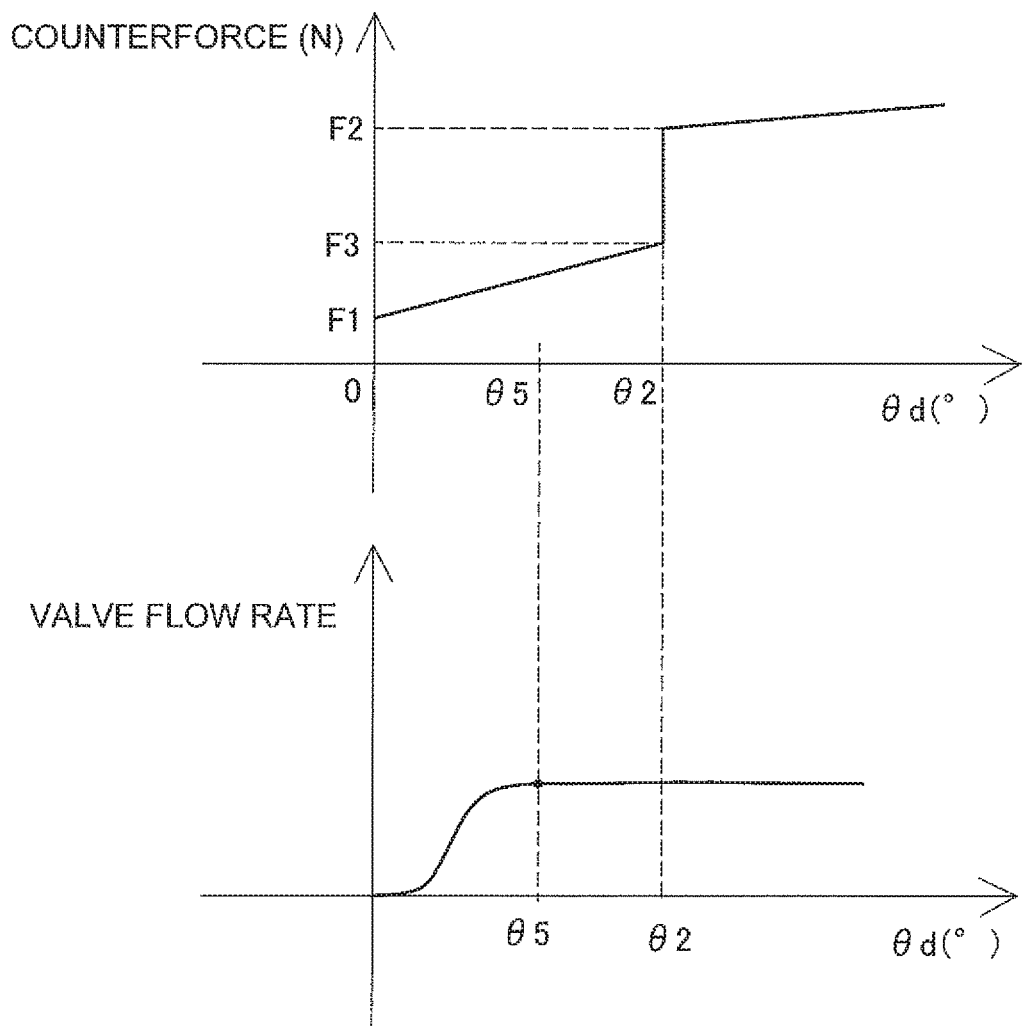
FIG. 8 is a view in which a graph representing the relationship of counterforces with respect to the lever relative angle and a graph representing the relationship of the flow rate of a hydraulic valve with respect to the lever relative angle are aligned one above the other.

In addition, as explained below, the steering cylinders 21 and 22 are controlled on the basis of the lever relative angle θd because the difference between the actual vehicle body frame angle θs_real and the actual lever angle θi_real corresponds to the lever relative angle θd. FIG. 8 is a view in which a graph representing the relationship of counterforces with respect to the lever relative angle θd and a graph representing the relationship of the flow rate of the hydraulic valve 31 with respect to the lever relative angle θd are aligned one above the other.

As illustrated in the lower graph in FIG. 8, the valve flow rate becomes the greatest when the lever relative angle θd reaches θ5, and the valve flow rate becomes substantially constant even if the lever relative angle θd increases from θ5. When the flow rate of the hydraulic valve 31 is greatest, the changing speed of the actual vehicle body frame angle θs_real becomes greatest. Therefore, even when there is a desire to quickly change the actual vehicle body frame angle θs_real and increase the lever relative angle, the changing speed of the actual vehicle body frame angle θs_real does not change when the lever relative angle θd exceeds θ5.

In addition, the angle θ5 at which the valve flow rate is greatest becomes smaller than the abovementioned angle θ2. As a result, when the operator operates the joystick lever 51 and feels a strong resistance, the operator is able to perceive that the changing speed of the actual vehicle body frame angle θs_real has reached the maximum changing speed. While only the rotation in the right direction Yr is illustrated in FIG. 8, the rotation in the left direction Yl is the same. In other words, when the absolute value of the lever relative angle θd reaches θ5, the flow rate from the hydraulic valve 31 is substantially the greatest and the absolute value θ5 of the lever relative angle θd where the flow rate from the hydraulic valve 31 is substantially the greatest may be set to be smaller than the absolute value of the catch-up angle.

2. Actions

Figure 9:
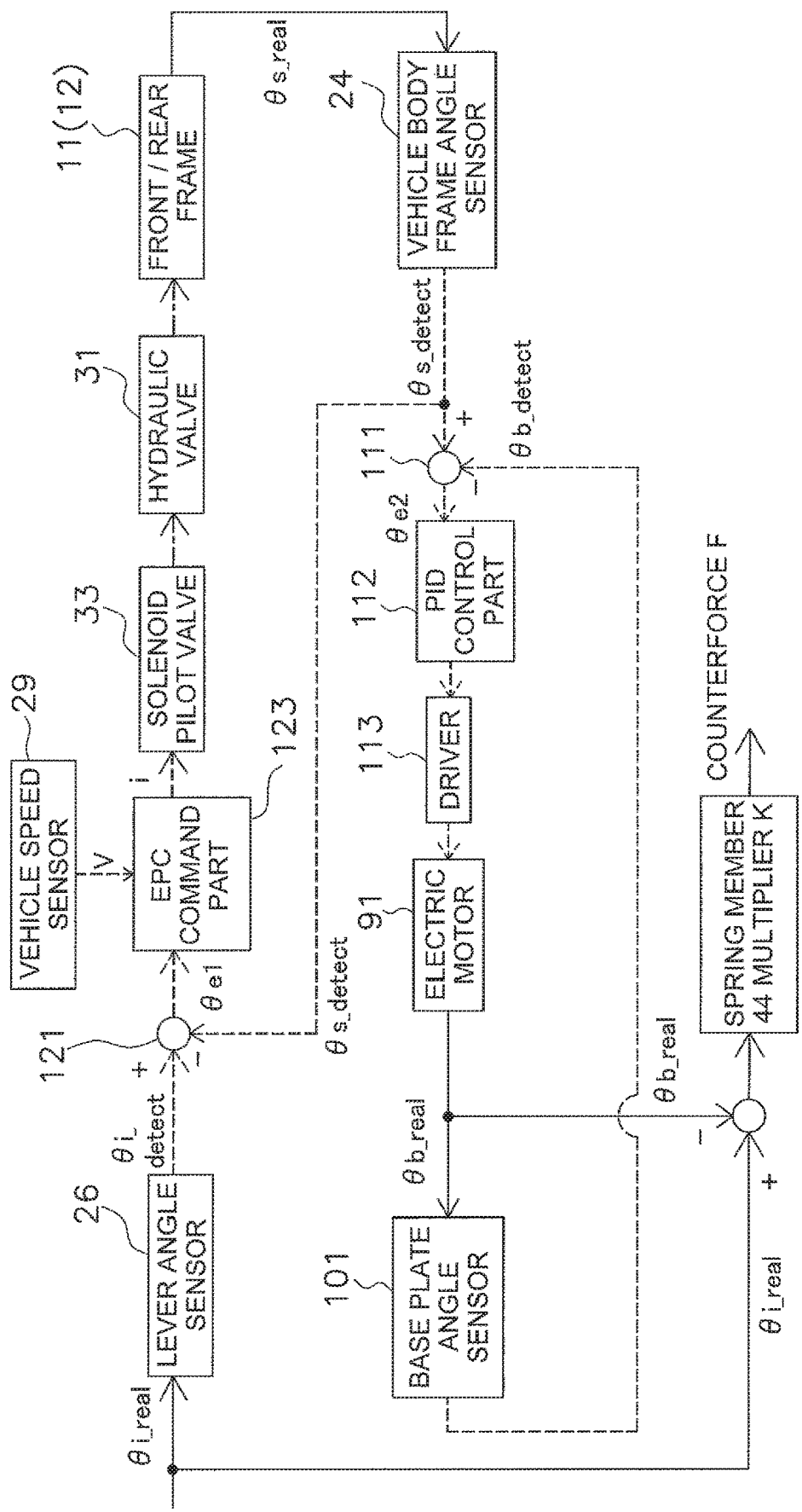
FIG. 9 is a block diagram for explaining the control actions of the wheel loader of FIG. 1.

The control actions of the wheel loader 1 of the present embodiment will be explained below. FIG. 9 is a block diagram for explaining the control actions of the wheel loader 1. In FIG. 9, the electrical actions are represented by solid lines, the mechanical actions are represented by dotted lines, and the actions using hydraulic pressure are represented by one dot chain lines.

(2-1. Lever Relative Angle |θd|≥θ2)

The situation in which the absolute value of the lever relative angle θd is less than θ2 will be explained first. That is, the above situation is when the joystick lever 51 is used in the range of the spring characteristic S1 of the first spring member 81.

As illustrated in FIG. 4E, the actual lever angle θi_real of the joystick lever 51 is zero when the joystick lever 51 is arranged in the center position (when arranged along the vertical direction). In addition, the actual vehicle body frame angle θs_real is also zero and the actual base plate angle θb_real of the base plate 71 is also zero. In the center position, the joystick lever 51 is not rotated with respect to the support frame 60 (the actual lever angle θi_real=zero), the base plate 71 is not rotated with respect to the support frame 60 (actual base plate angle θb_real=zero), and the holder plate 84 is not rotated with respect to the support frame 60 (holder plate angle θh=zero).

In the present embodiment, the actual vehicle body frame angle θs_real is the angle from the state in which the actual vehicle body frame angle θs_real is zero in the front-back direction with respect to the rear frame 12 as illustrated in FIG. 3. Additionally, the actual lever angle θi_real represents the rotation angle of the joystick lever 51 from the center position as illustrated in FIG. 3. When deriving the difference (deviation angle) for example, the rotation to the right may be computed as a plus angle and the rotation to the left may be computed as a minus angle.

At this time, the solenoid pilot valve 33 is in the neutral position. In this case, the hydraulic valve 31 is also in the neutral position. As a result, the supply and discharge of oil to and from the left and right steering cylinders 21 and 22 is not carried out and the actual vehicle body frame angle θs_real is maintained at zero.

The operator then applies an operating force −Fin for rotating the joystick lever 51 from the center position to the left direction Yl side. When the operating force −Fin exceeds the initial counterforce −F1 (see FIG. 5) of the first spring member 81, the joystick lever 51 rotates leftward and the actual lever angle θi_real decreases as illustrated in FIG. 6A. The counterforce imparted by the first spring member 81 increases in accordance with the movement to the left. In the following example, a situation is explained in which the joystick lever 51 has been rotated in the left direction Yl until the lever angle θi equals −θ2. That is, the joystick lever 51 has been operated within the spring characteristic S1 of the first spring member 81. For example, the joystick lever 51 has been operated so that the lever rotation angle θ2 equals −12.5°. As illustrated in FIG. 9, feedback control of the base plate is performed based on the deviation between the vehicle body frame angle and the base plate angle.

When the holder plate 84 and the base plate 71 rotate toward the rotation position of the joystick lever 51 due to the feedback control, the deviation angle between the actual lever angle θi_real and the actual base plate angle θb_real decreases as illustrated in FIG. 5 whereby the biasing force produced by the first spring member 81 is reduced.

Figure 10A:
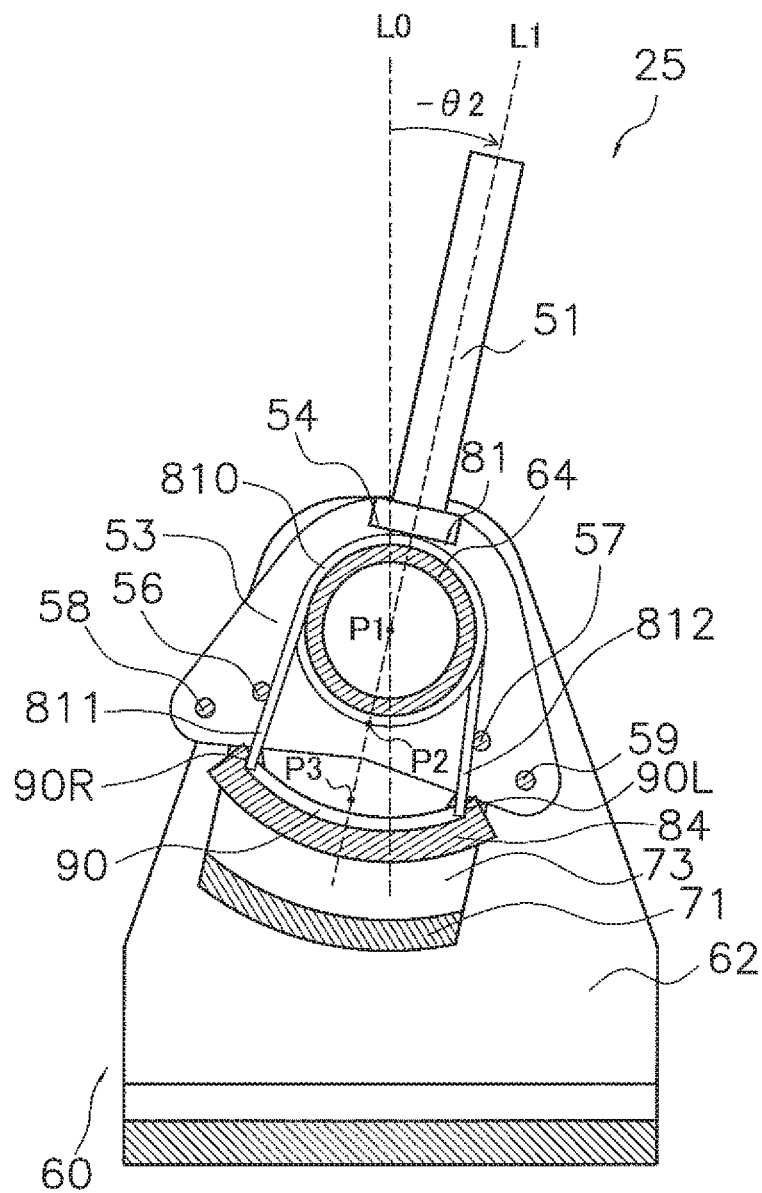
FIG. 10A is a cross-sectional view for explaining the control actions of the wheel loader of FIG. 1.
Figure 10B:
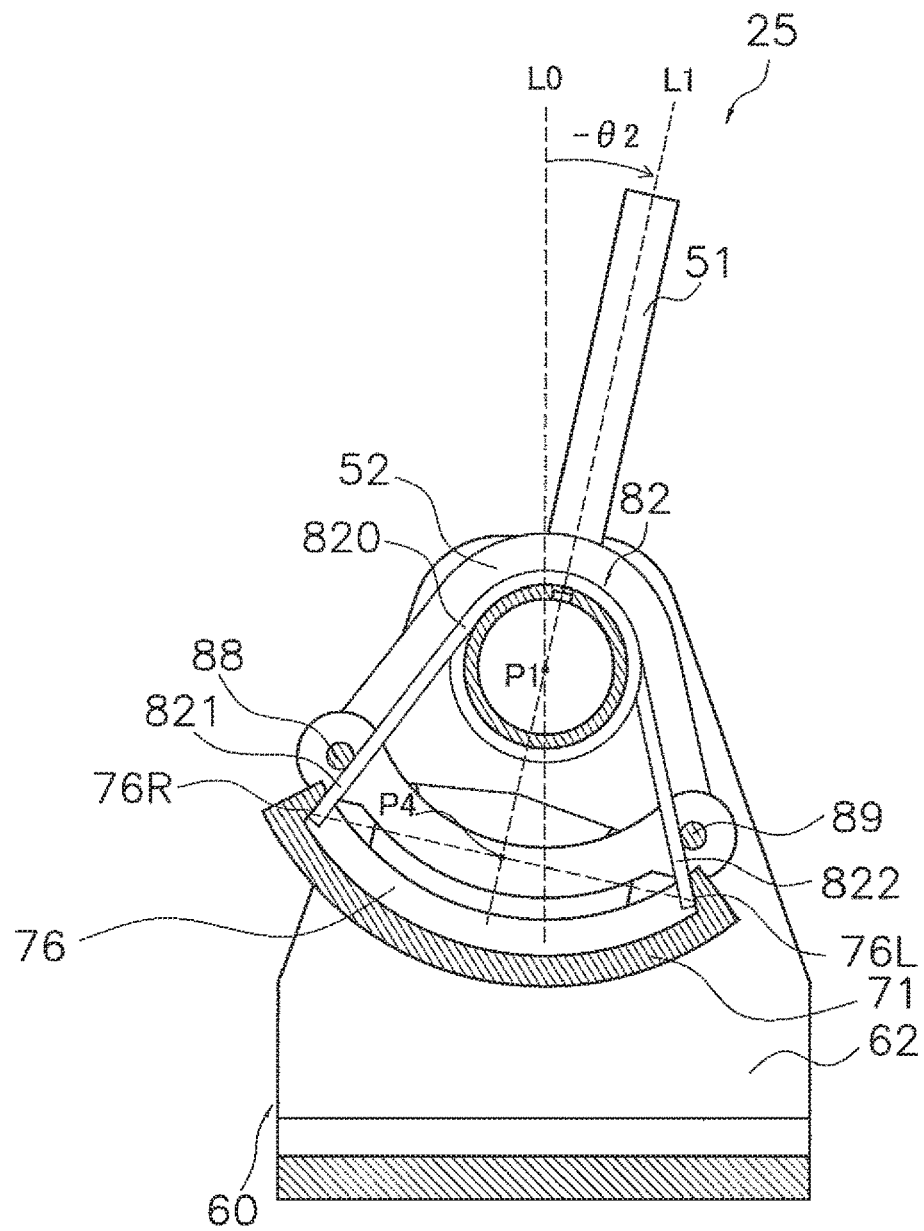
FIG. 10B is a cross-sectional view for explaining the control actions of the wheel loader of FIG. 1.

When the operator stops the joystick lever 51 at the position where the actual lever angle θi_real is the predetermined value −θ2 (i=1), the actual vehicle body frame angle θs_real gradually decreases whereby the difference (deviation angle) between the value −θ2 of the actual lever angle θi_real and the rotation angle of the actual vehicle body frame angle θs_real decreases. Then, when the actual vehicle body frame angle θs_real catches up to the value θ2 of the actual lever angle θi_real, the difference (deviation angle) becomes zero. At this time, the solenoid pilot valve 33 is in the neutral position and the hydraulic valve 31 is also in the neutral position. As a result, the supply and discharge of oil to and from the left and right steering cylinders 21 and 22 is not carried out and the actual vehicle body frame angle θs_real is maintained at the rotation angle −θ2. In addition, as illustrated in FIG. 10A and FIG. 10B, the base plate 71 also rotates in the clockwise direction by the value −θ2 of the actual base plate angle θb_real, and the straight line L1 that passes through the center of the joystick lever 51 is positioned in the center of the holder plate 84 and the center of the base plate 71. Specifically, the base plate 71 is arranged at the position where the midpoint P4 between the right end 76R and the left end 76L of the groove 76 is arranged on the straight line L1. The holder plate 84 is arranged at the position where the midpoint P3 between the right end 90R and the left end 90L of the groove 90 is arranged on the straight line L1. The positional relationship of the base plate 71, the holder plate 84, and the joystick lever 51 becomes the same positional relationship illustrated in FIG. 4E and FIG. 4F.

(2-2. When Lever Relative Angle |θd|≥θ2)

A situation in which an articulated operation is performed leftward from the state in which the actual vehicle body frame angle θs_real is rotated to the right side at the maximum (vehicle body right full articulation) will be explained herein below.

Figure 11A:
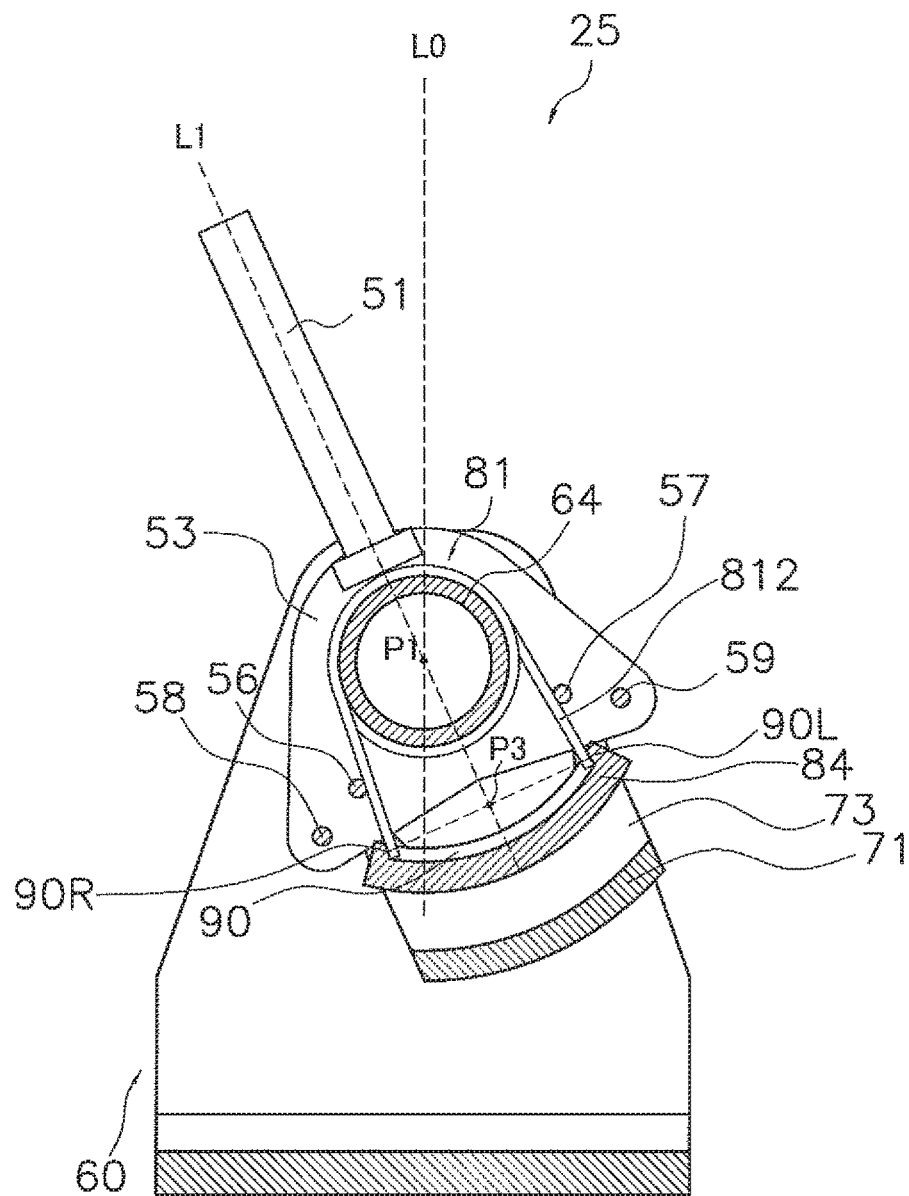
FIG. 11A is a cross-sectional view for explaining the control actions of the wheel loader of FIG. 1.
Figure 11B:
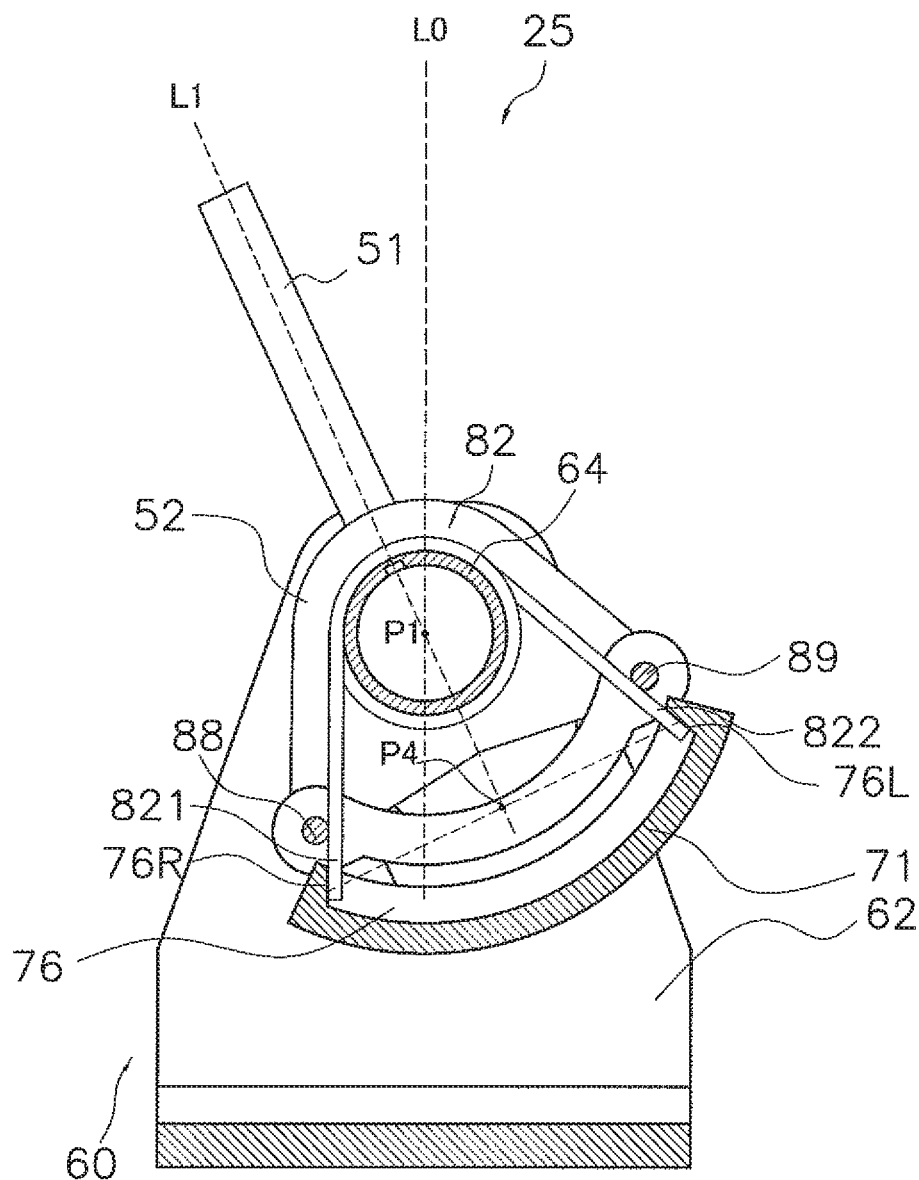
FIG. 11B is a cross-sectional view for explaining the control actions of the wheel loader of FIG. 1.

FIG. 11A is a cross-sectional view illustrating the operating unit 25 when the actual lever angle θi_real equals 25°, the holder plate angle θh equals 25°, and the actual base plate angle θb_real equals 25° and is a reference arrow cross-sectional view along line A to A' in FIG. 4B. FIG. 11B is a cross-sectional view illustrating the operating unit 25 when the actual lever angle θi_real equals 25°, the holder plate angle θh equals 25°, and the actual base plate angle θb_real equals 25° and is a reference arrow cross-sectional view along line B to B' in FIG. 4B.

In the states illustrated in FIG. 11A and FIG. 11B, the actual lever angle θi_real is rotated rightward to the maximum angle of 25° rightward, and the holder plate angle θh and the actual base plate angle θb_real are positioned at 25° whereby the solenoid pilot valve 33 and the hydraulic valve 31 are in the neutral positions. In addition, the actual vehicle body frame angle θs_real is maintained at the maximum angle of +40°.

The joystick lever 51 is moved from the above state to the left so that the actual lever angle θi_real becomes −25°. Directly after the actual lever angle θi_real has been changed, the actual vehicle body frame angle θs_real is substantially zero and therefore the actual base plate angle θb_real is substantially zero. Therefore, the lever relative angle θd is (actual lever angle θi_real)−(actual base plate angle θb_real) and therefore is approximately −50°.

Figure 12A:
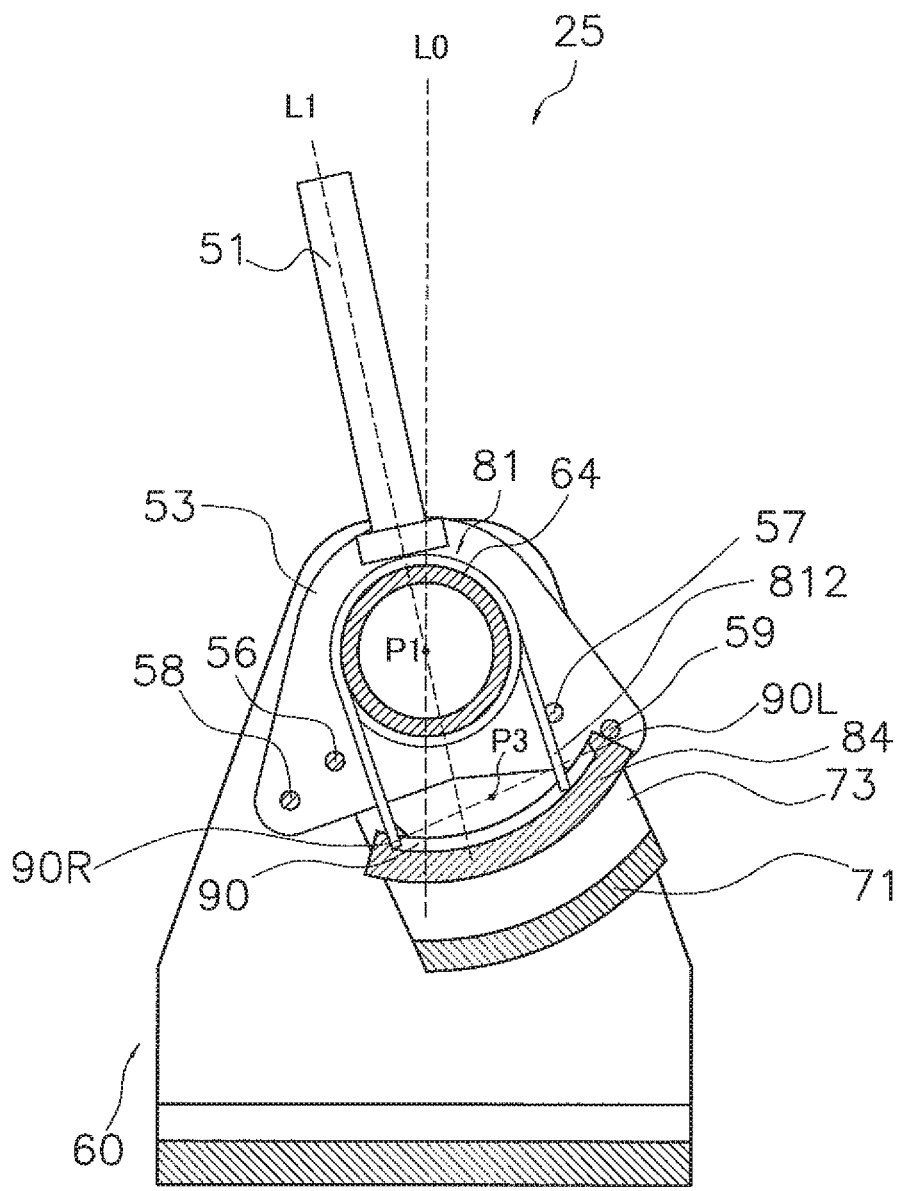
FIG. 12A is a cross-sectional view for explaining the control actions of the wheel loader of FIG. 1.
Figure 12B:
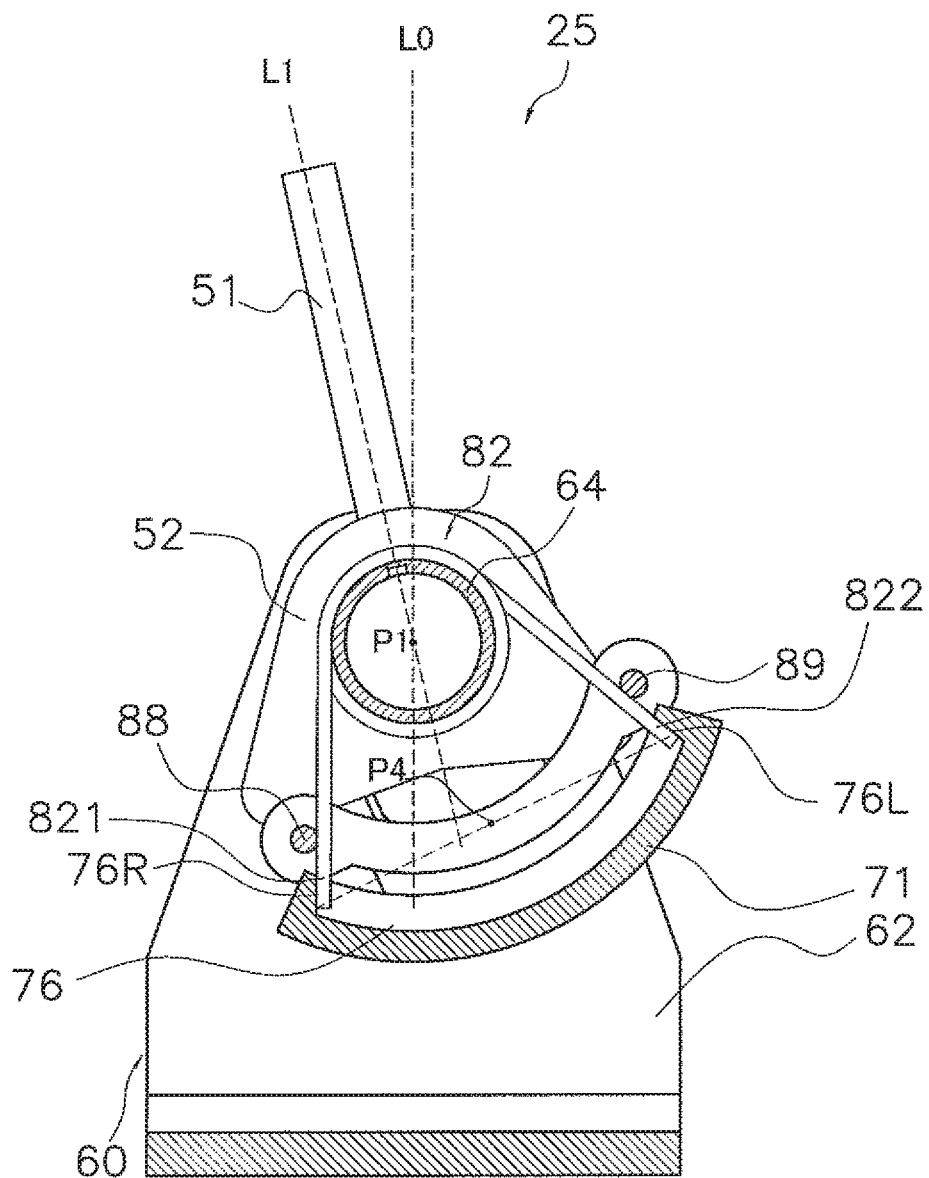
FIG. 12B is a cross-sectional view for explaining the control actions of the wheel loader of FIG. 1.

FIG. 12A is a reference arrow cross-sectional view illustrating the operating unit 25 when the joystick lever 51 has been rotated from the state illustrated in FIG. 11A until the actual lever angle θi_real reaches 12.5°, and is a reference arrow cross-sectional view along line A to A' FIG. 4B. FIG. 12B is a reference arrow cross-sectional view illustrating the operating unit 25 when the joystick lever 51 has been rotated from the state illustrated in FIG. 11A until the actual lever angle θi_real reaches 12.5°, and is a reference arrow cross-sectional view along line B to B' FIG. 4B. At this time, the actual lever angle θi_real is 12.5°, the actual base plate angle θb_real is 25°, and the holder plate angle θh is 25°. In addition, the lever relative angle θd is (actual lever angle θi_real)−(actual base plate angle θb_real) and therefore becomes −12.5°.

Figure 13A:
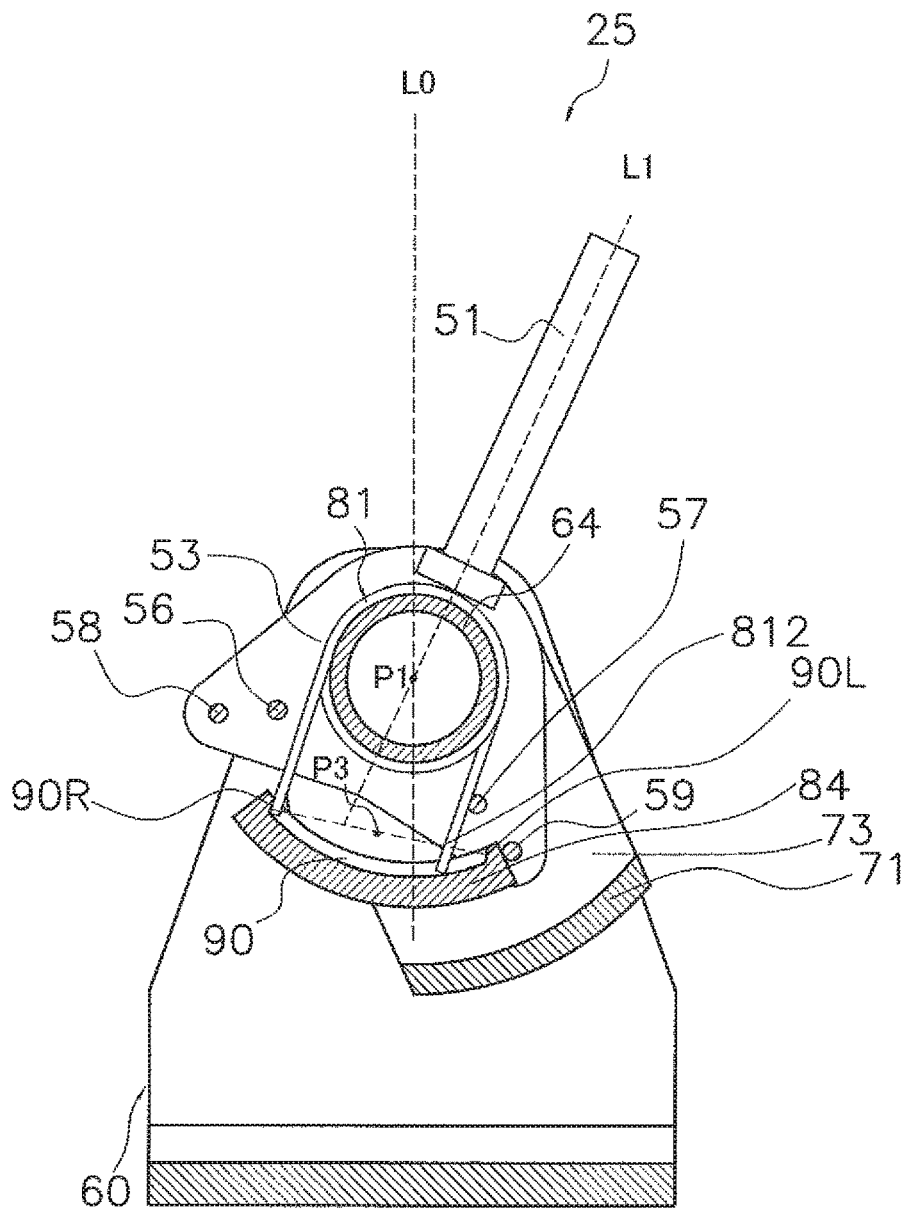
FIG. 13A is a cross-sectional view for explaining the control actions of the wheel loader of FIG. 1.

In this case, while the second end part 812 of the first spring member 81 is pushed against the connecting member 57 of the lever unit 41 and is pushed clockwise in FIG. 12A, the second end part 812 abuts against the right end 90R whereby the first spring member 81 is deflected. Conversely, because the absolute value of the force −F2 for starting the deflection of the second spring member 82 is greater than the counterforce −F3 of the first spring member 81 at the relative angle −θ2, the second spring member 82 does not deflect as illustrated in FIG. 13A while the relative angle θd is in the range from zero to −θ2 (in the present embodiment, θ2 = 12.5). As a result, the holder plate angle θh and the actual base plate angle θb_real match each other. The holder plate angle θh and the actual base plate angle θb_real matching each other indicates that the midpoint P4 of the base plate 71 is positioned on the straight line that links the midpoint P3 of the holder plate 84 and the center P1 of the rotating shaft 64 in the front view.

While the joystick lever 51 is further rotated to the left from the state illustrated in FIG. 12A until the actual lever angle θi_real becomes −25°, as illustrated in FIG. 12A, it becomes necessary to deflect the second spring member 82 and rotate with the holder plate 84 because the abutting member 59 abuts against the holder plate 84.

As a result, the operator perceives a resistance in order to move the joystick lever 51 further from the state where the lever relative angle θd equals 12.5°. The operator operates and rotates the joystick lever 51 with an operational force equal to or greater than F2 whereby the lever relative angle θd becomes a value of 12.5 or greater.

Figure 13B:
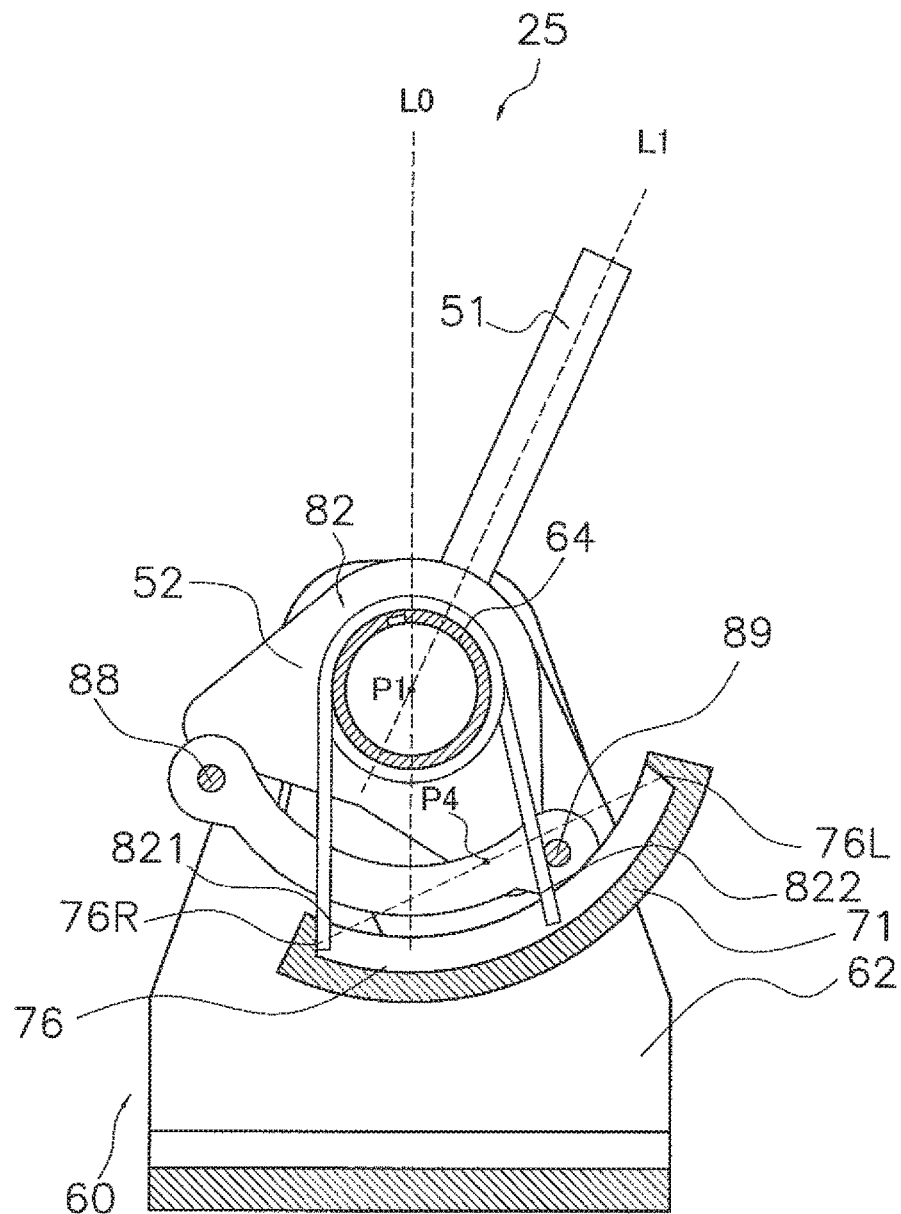
FIG. 13B is a cross-sectional view for explaining the control actions of the wheel loader of FIG. 1.

FIG. 13A is a cross-sectional view illustrating the operating unit 25 when the joystick lever 51 has been rotated from the state illustrated in FIG. 12A until the actual lever angle θi_real reaches −25°, and is a reference arrow cross-sectional view along line A to A' FIG. 4B. FIG. 13B is a cross-sectional view illustrating the operating unit 25 when the joystick lever 51 has been rotated from the state illustrated in FIG. 12A until the actual lever angle θi_real reaches −25°, and is a reference arrow cross-sectional view along line B to B' FIG. 4B. At this time, the actual lever angle θi_real is −25°, the actual base plate angle θb_real is +25°, and the holder plate angle θh is 12.5°. In addition, the lever relative angle θd is (actual lever angle θi_real)−(actual base plate angle θb_real) and therefore becomes −50°.

As illustrated in FIG. 13A, the holder plate 84 is rotated by the abutting member 59 whereby the positional relationship between the joystick lever 51 and the holder plate 84 is the same as illustrated in FIG. 12A.

However as illustrated in FIG. 13B, while the second end part 822 of the second spring member 82 is pushed to the right direction Yr side by the connecting member 89 of the holder plate 84, the first end part 821 abuts against the right end 76R of the groove 76 and therefore the second spring member 82 is deflected.

The actual lever angle θi_real inputted due to the operation of the joystick lever 51 in this way is detected, and the base plate 71 rotates with respect to the support frame 60 until the actual base plate angle θb_real reaches −25°.

Embodiment 2

A wheel loader 1 of a second embodiment according to the present invention is explained hereinbelow. The wheel loader of the second embodiment has a lever unit with a different configuration from the wheel loader 1 of the first embodiment. As a result the explanation will focus on the differences and explanations of other similar configurations will be omitted.

While the lever unit 41 is biased to a predetermined position with respect to the base plate 71 by the first spring member 81 and the second spring member 82 in the operating unit 25 of the first embodiment, in an operating unit 425 of the second embodiment, a lever unit 441 is biased to a predetermined position with respect to a base plate 471 by a biasing part 444 having a cam mechanism.

Figure 14A:
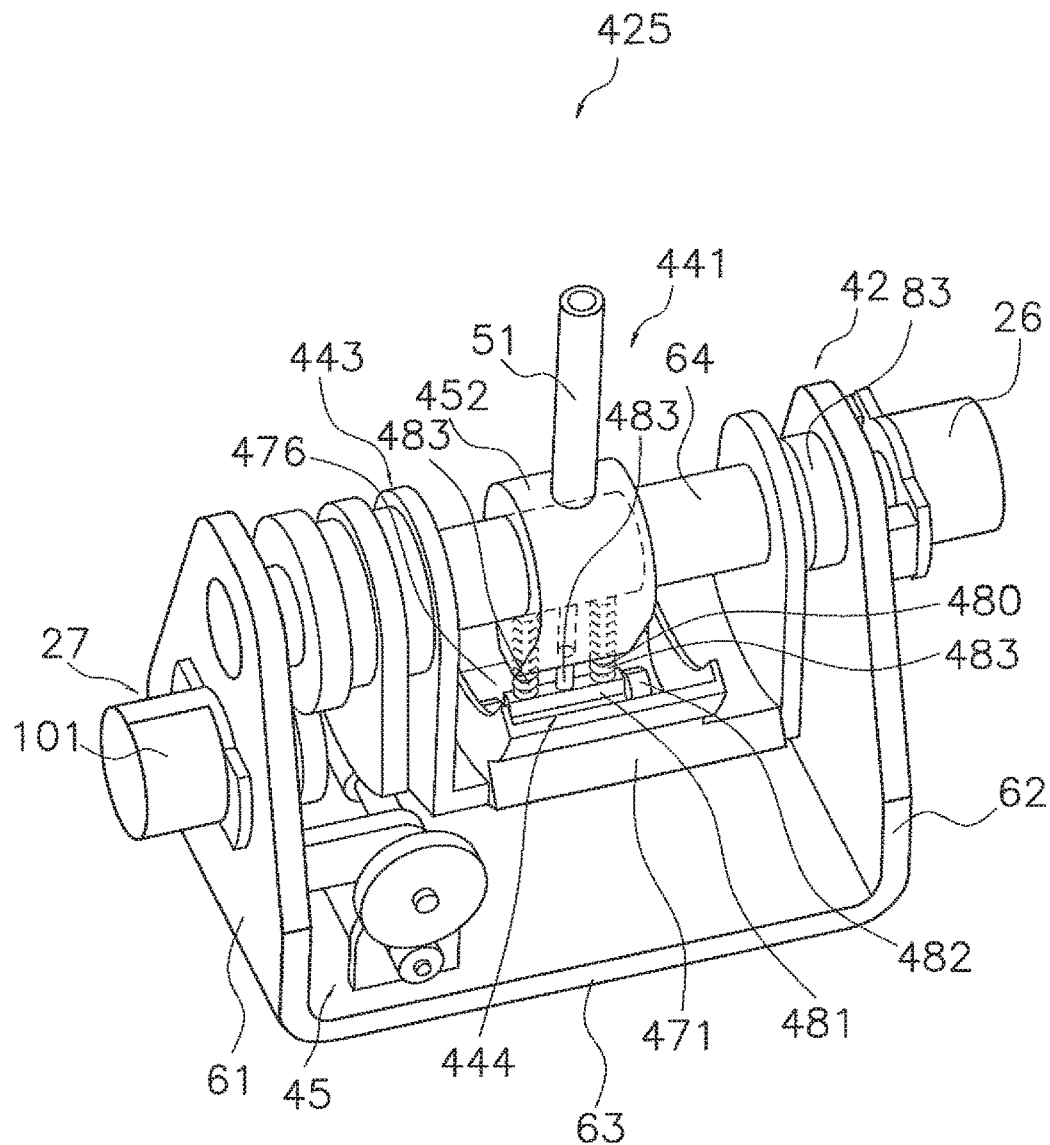
FIG. 14A is a perspective view illustrating an operating unit of a wheel loader of a second embodiment according to the present invention.
Figure 14B:
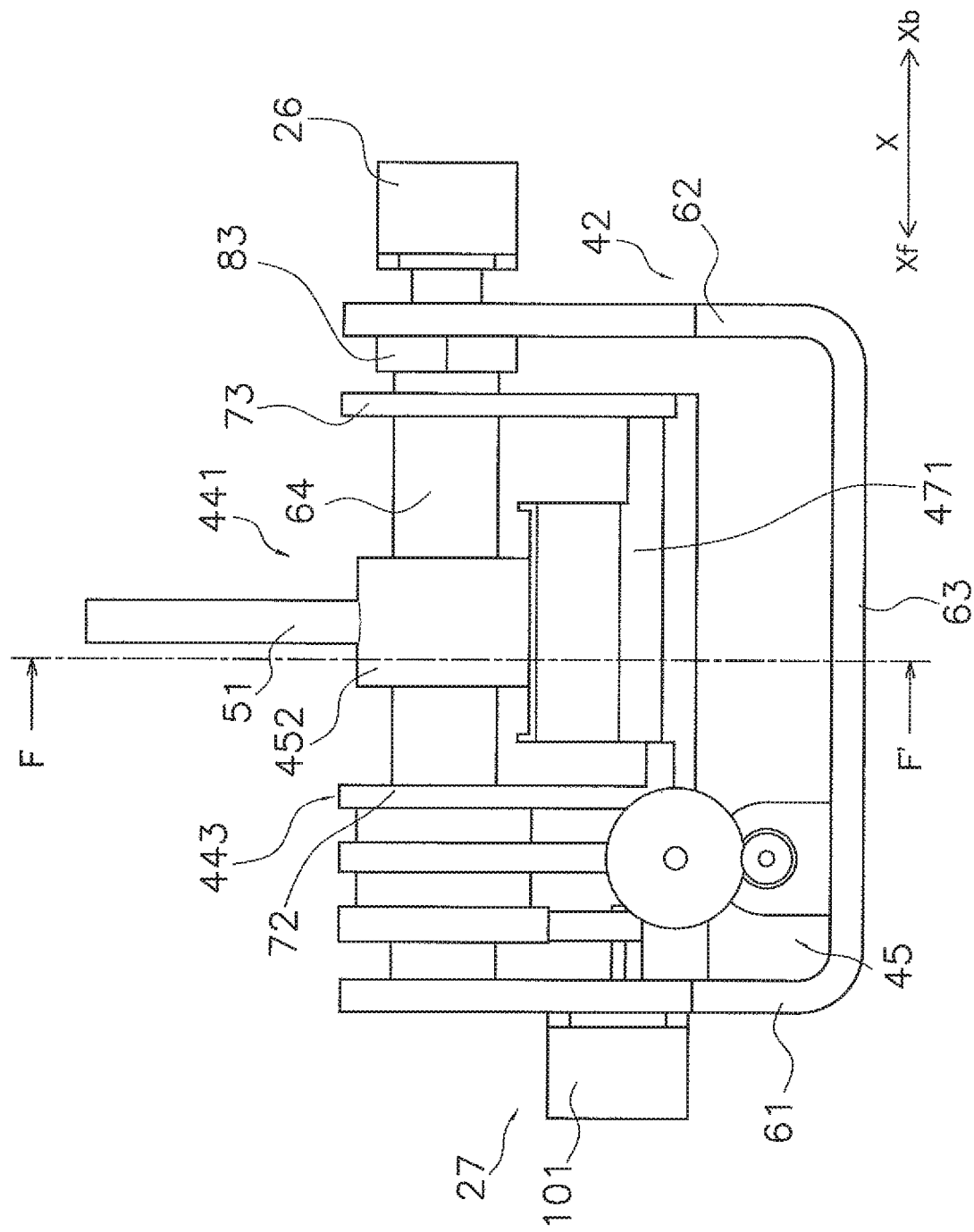
FIG. 14B is a side view illustrating the operating unit of FIG. 14A.
Figure 14C:
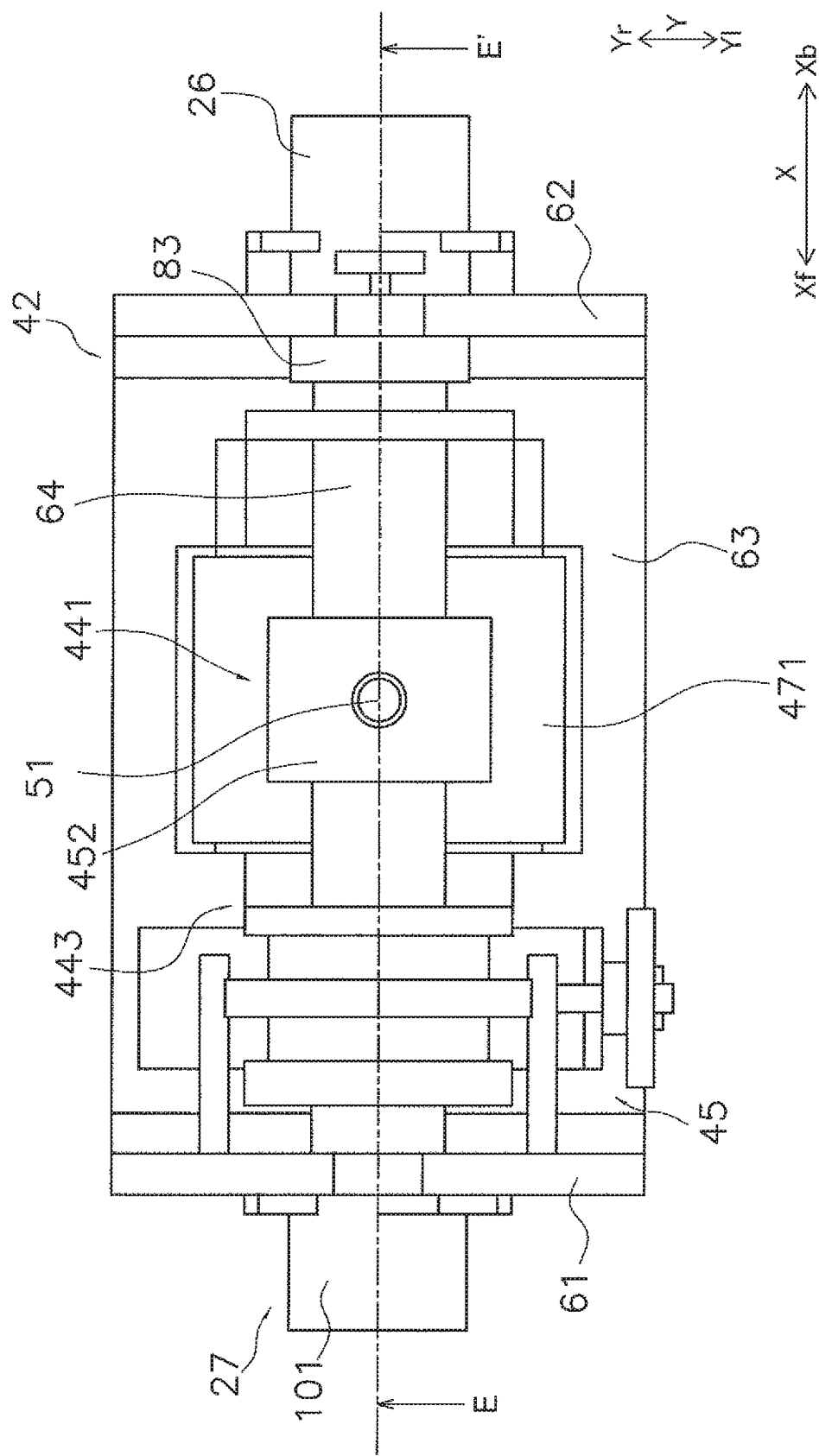
FIG. 14C is a plan view illustrating the operating unit of FIG. 14A.
Figure 14D:
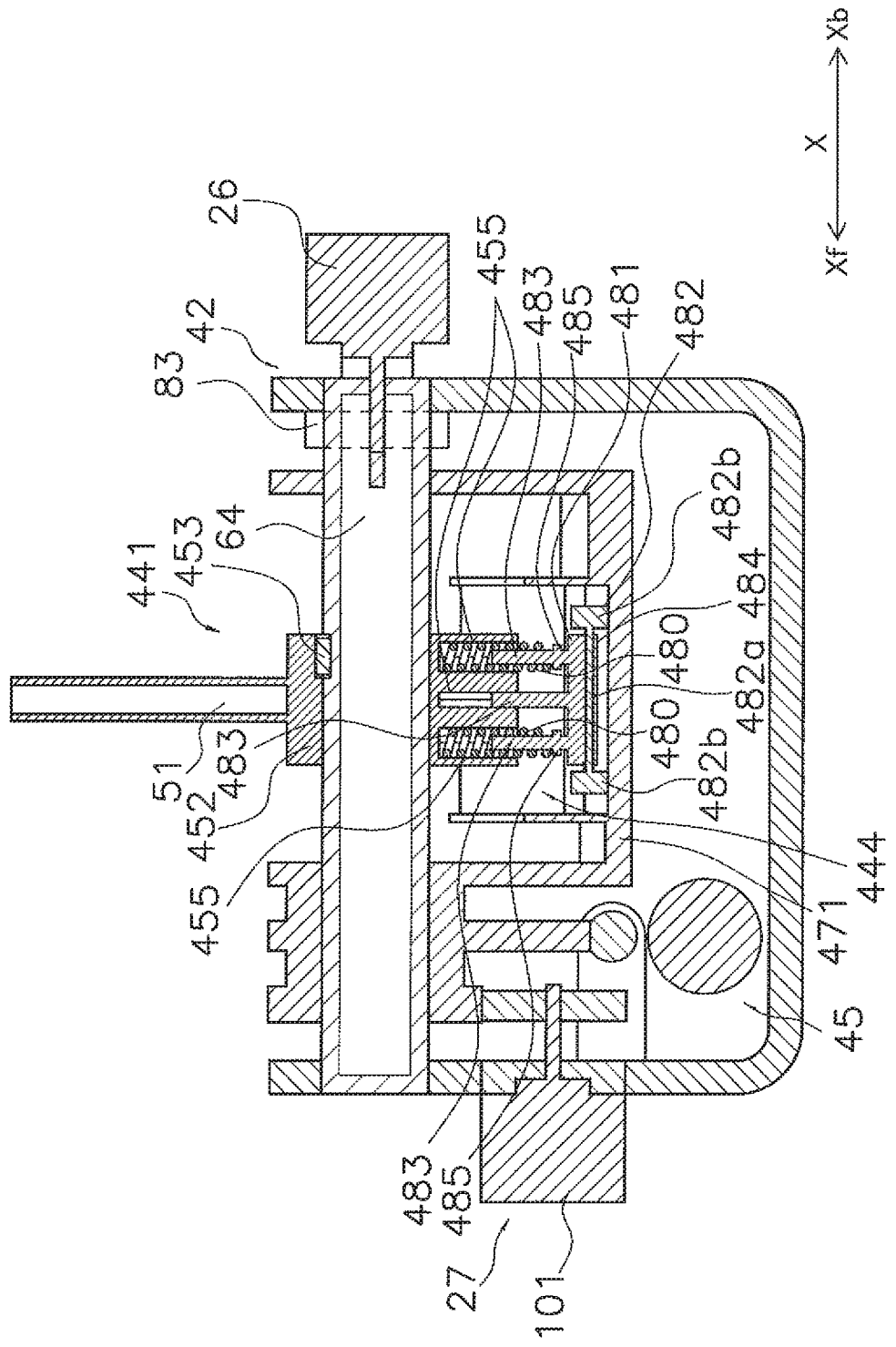
FIG. 14D is a reference arrow cross-sectional view along line E to E' in FIG. 14C.
Figure 14E:
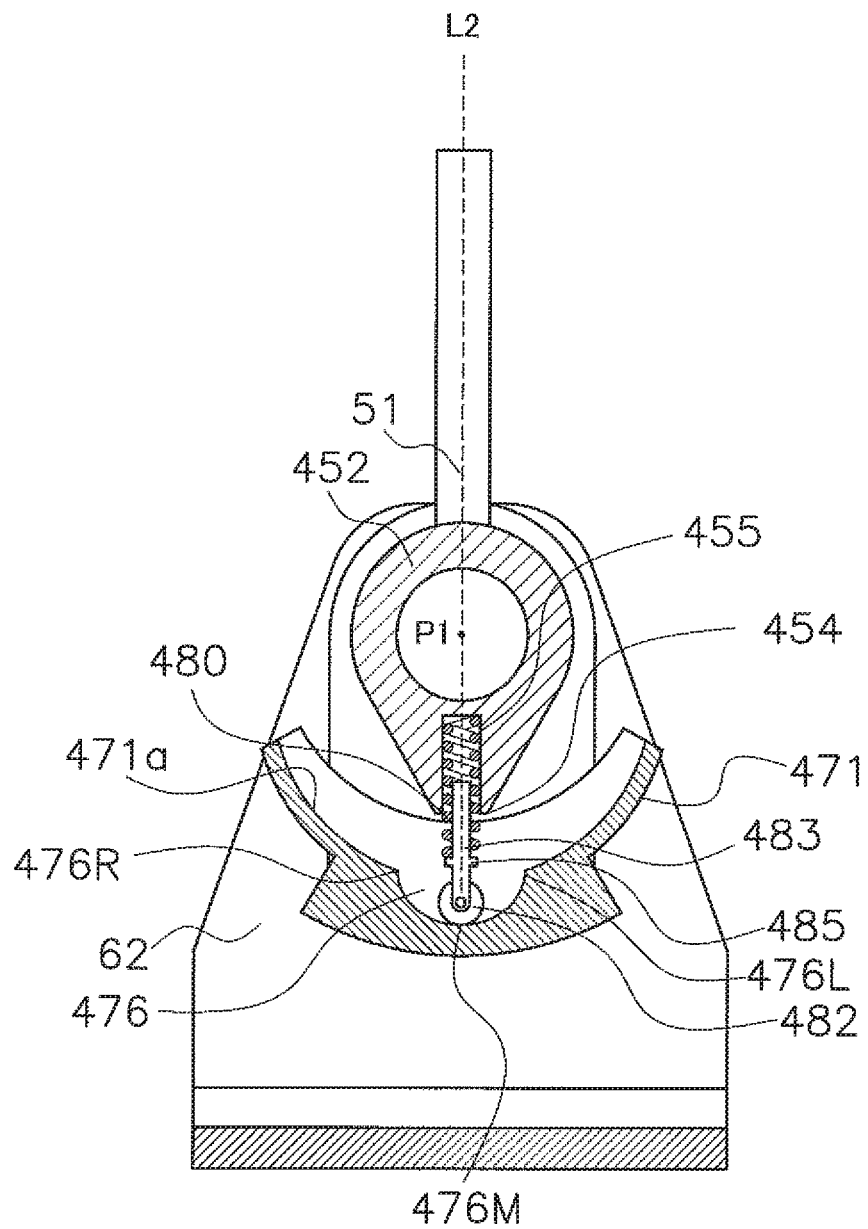
FIG. 14E is a reference arrow cross-sectional view along line F to F' in FIG. 14B.

FIG. 14A is a perspective view of the operating unit 425 of the present embodiment. FIG. 14B is a side view of FIG. 14A. FIG. 14C is a plan view of FIG. 14A. FIG. 14D is a reference arrow cross-sectional view along line E to E' in FIG. 14C. FIG. 14E is a reference arrow cross-sectional view along line F to F' in FIG. 14B.

(1. Lever Unit 441)

The lever unit 441 of the present embodiment has the joystick lever 51 and a coupling part 452 that couples the joystick lever 51 to the rotating shaft 64.

The joystick lever 51 is fixed to the coupling part 452. The coupling part 452 is a member having a thickness in the front-back direction X, and the upper part has a semicircular shape and the lower part has a triangular shape as seen in the cross-section as illustrated in FIG. 14E. The coupling part 452 has a through-hole formed therein in the front-back direction X, and the rotating shaft 64 is inserted into the through-hole. As illustrated in FIG. 14D, recessed parts are formed in the coupling part 452 and the rotating shaft 64, and a key 453 is fitted into the recessed parts. The rotation of the joystick lever 51 is transmitted to the rotating shaft 64 via the coupling part 452 by means of the key 453.

As illustrated in FIG. 14E, a lower end 454 that is the tip end of the triangular shape of the coupling part 452 is positioned on the line L1 in the longitudinal direction of the joystick lever 51. Holes 455 along the line L2 are formed at the lower end 454 of the coupling part 452. As illustrated in FIG. 14D, three holes 455 are formed side by side in the front-back direction X.

(2. Biasing Part 444)

As illustrated in FIG. 14D, the biasing part 444 has spring members 480, a cam 481, a cam follower 482, and the damper 83. The spring members 480 are arranged inside the front and rear holes 455 excluding the middle hole 455 among the three holes 455. The cam 481 has three rod-like parts 483 and a cam follower support part 484. The three rod-like parts 483 are inserted into the respective holes 455 from below. The middle hole 455 is formed substantially coaxially with the rod-like parts 483 and functions as a guide. Abutting parts 485 are formed in the proximity to the lower ends of two of the rod-like parts 483 excluding the middle rod-like part in the front-back direction X, and abut against the lower ends of the spring members 480. The cam follower support part 484 is provided at the lower side of the three rod-like parts 483 and is fixed to the lower ends of the three rod-like parts 483. A through-hole is formed in the front-back direction of the cam follower support part 484 and a shaft part 482a of the cam follower 482 is arranged in the through-hole.

The cam follower 482 has the shaft part 482a and rotating parts 482b that are arranged at both ends of the cam follower 482. As a result, the cam follower 482 is configured to be rotatable with respect to the cam follower support part 484.

(3. Base Part 443)

In addition, a base part 443 of the second embodiment has the base plate 471 that has a different shape than the base plate 71 in comparison to the base part 43 of the first embodiment. As illustrated in FIG. 14E, the base plate 471 has a groove part 476 that is curved in a convex shape that points downward. The groove part 476 is curved toward a middle 476M in the vehicle width direction Y.

The cam follower 482 is pressed against the bottom surface of the groove part 476 by the elastic force of the spring members 480.

According to the above configuration of the biasing part 444, the lever unit 441 is biased with respect to the base plate 471 to a position where the straight line L2 passes through the middle 476M of the groove part 476.

Figure 14F:
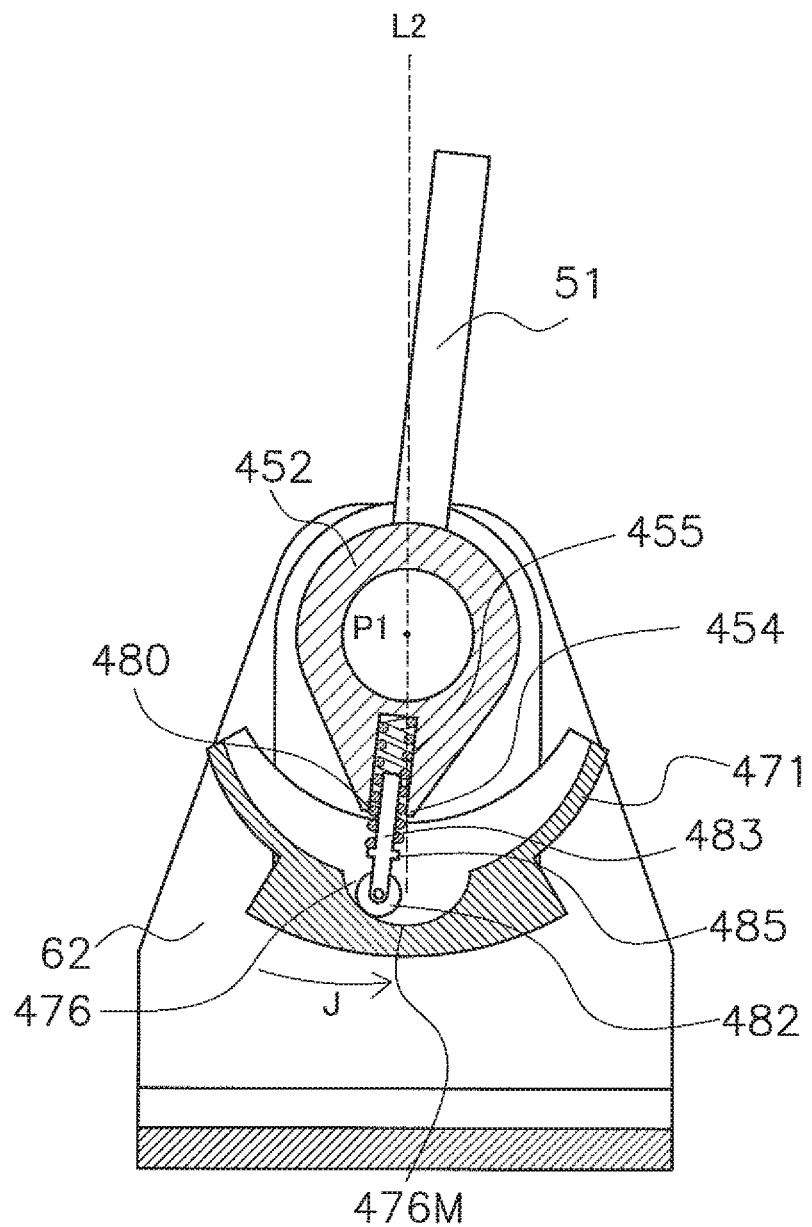
FIG. 14F is a cross-sectional view for explaining an action of the operating unit in FIG. 14E.

For example, as illustrated in FIG. 14F, in the state in which the joystick lever 51 rotates leftward and the base plate 471 does not rotate, the cam follower 482 is pressed against the bottom surface of the groove part 476 by the biasing force of the spring members 480, and a force acts on the cam follower 482 so that the cam follower 482 rotates toward the middle 476M (see arrow J).

In this way, the lever unit 441 is biased with respect to the base plate 471 so that the cam follower 482 is positioned in the middle 476M. Consequently, a counterforce can be produced when the operator operates the joystick lever 51 and an operational feel can be imparted to the operator.

In addition, when the cam follower 482 overrides the upper surface 471a of the base plate 471 from the groove part 476, the increasing rate of the counterforce becomes larger in comparison to when the cam follower 482 moves within the groove part 476. That is, the positions of the right end 476R and the left end 476L of the groove part 476 illustrated in FIG. 14E correspond respectively to the lever relative angles θd at +θ2 and −θ2. In this way, the right end 476R and the left end 476L form inflection points. The right end 476R and the left end 476L can also be said to form edges.

Consequently, the operator is able to perceive when the lever relative angle θd has reached ±θ2.

Characteristics (1)

The wheel loader 1 (example of the work vehicle) of the present embodiments comprises the steering cylinders 21 and 22 (examples of the hydraulic actuator), the vehicle body frame angle sensor 24 (example of the actual steering angle detecting part), the operating unit 25 or the operating unit 425, the motor drive control part 110 (example of the position adjustment control part), and the steering control part 120. The steering cylinders 21 and 22 change the actual vehicle body frame angle θs_real (example of the actual steering angle). The vehicle body frame angle sensor 24 detects the actual vehicle body frame angle θs_real as the detection value θs_detect of the vehicle body frame angle. The operating unit 25, 425 performs a steering operation and has the support part 42, the base plate 71, 471 (example of the rotating part), the joystick lever 51 (example of the operating part), the biasing part 44, 444, and the position adjusting part 45. The base plate 71, 471 (example of the rotating part) is rotatably supported by the support part 42. The joystick lever 51 is rotatably supported by the support part 42 and is operated and rotated by the operator. The biasing part 44, 444 biases the joystick lever 51 to a predetermined position with respect to the base plate 71. The position adjusting part 45 adjusts the rotation angle of the base plate 71 with respect to the support part 42. The motor drive control part 110 (example of the position adjustment control part) controls the position adjusting part 45 on the basis of the detection value θs_detect of the vehicle body frame angle. The steering control part 120 controls the steering cylinders 21 and 22 on the basis of the rotation operation of the joystick lever 51. When the joystick lever 51 is operated and rotated to the right or left direction (example of the predetermined direction) with respect to the base plate 71, 471, the biasing part 44, 444 produces a counterforce that corresponds to the absolute value of the lever relative angle θd when the absolute value of the lever relative angle θd of the joystick lever 51 with respect to the base plate 71, 471 is less than the angle θ2 (example of the first predetermined angle), and increases the counterforce up to F2 (example of the predetermined counterforce) when the absolute value of the lever relative angle θd is at the angle θ2, and after the counterforce at the angle θ2 has reached F2, produces a counterforce that corresponds to the lever relative angle θd.

As a result, an operational feel can be imparted by the biasing part 44 or the biasing part 444 to the operation of the joystick lever 51 by the operator, whereby an actuator such as a motor for generating an operational feel does not need to be used. As a result, the size of the operating unit 25, 425 can be reduced.

In addition, by raising the increasing rate of the counterforce with respect to the relative angle, the operator feels a sudden increase in the resistance when the relative angle reaches the first predetermined angle during the rotation and operation of the operating part, and the operator is able to perceive information related to the work vehicle.

As described above, there can be provided the operating unit 25, 425 the size of which can be reduced and which enables the operator to perceive information related to the wheel loader 1.

In addition, the first predetermined position is, for example, the position of the joystick lever 51 when the straight line L1 passes through the midpoint P4 of the base plate 71.

Moreover, the operator is able to feel a sudden increase in the resistance at the angle θ2.

(2)

In the wheel loader 1 (example of the work vehicle) of the present embodiments, the angle θ2 (example of the absolute value of the first predetermined angle) is larger than the angle θ5 (example of an absolute value of the relative angle) where the acting speed of the steering cylinders 21 and 22 (example of the hydraulic actuator) reaches the greatest acting speed.

As a result, the operator is alerted to the fact that the acting speed of the steering cylinders 21 and 22 has reached the greatest acting speed due to the operator feeling the sudden increase in the resistance. As a result, the operator does not perform the useless actions of intending to further raise the operating speed or further rotate the joystick lever 51, and ease of operation is improved.

(3)

The wheel loader 1 (example of the work vehicle) of the present embodiments is further provided with the hydraulic valve 31 (example of the steering valve). The hydraulic valve 31 controls the flow rate of oil supplied to the steering cylinders 21 and 22 (example of the hydraulic actuator) on the basis of the rotation operation of the joystick lever 51 (example of the operating part). The absolute value of the relative angle when the acting speeds of the steering cylinders 21 and 22 reach the maximum acting speed is the angle θ5 (example of the absolute value of the relative angle) when the flow rate supplied from the hydraulic valve 31 reaches the maximum flow rate.

As a result, the operator is alerted to the fact that the flow rate of hydraulic fluid supplied from the hydraulic valve 31 has reached the maximum flow rate due to the operator feeling the sudden increase in the resistance. As a result, the operator does not perform the useless actions of intending to further increase the flow rate of hydraulic fluid or further rotate the joystick lever 51, and ease of operation is improved.

(4)

The wheel loader 1 (example of the work vehicle) of the present embodiments is further provided with a solenoid pilot valve 33 (example of the control valve). The solenoid pilot valve 33 controls the flow rate of oil supplied to the steering cylinders 21 and 22 (example of the hydraulic actuator) on the basis of the rotation action of the joystick lever 51. The steering cylinders 21 and 22 are in the neutral position while the joystick lever 51 is arranged in the first predetermined position.

Consequently, while the joystick lever 51 is arranged in the first predetermined position with respect to the base plate 71, 471 (example of the rotating part), the actual vehicle body frame angle θs_real (example of the actual steering angle) is not changed, and when the position of the joystick lever 51 with respect to the base plate 71, 471 rotates from the first predetermined position, on the basis of the relative angle thereof, the steering cylinders 21 and 22 are controlled and the actual vehicle body frame angle θs_real can be changed.

(5)

In the wheel loader 1 (example of the work vehicle) of the present embodiments, the first predetermined position is the position where the lever relative angle θd (example of the relative angle) is zero.

Consequently, the counterforce can be increased in accordance with the increase of the relative angle from the position where the lever relative angle θd is zero.

(6)

In the wheel loader 1 (example of the work vehicle) of the present embodiments, the biasing part 44 has the holder plate 84 (example of the intermediate rotating part), the first spring member 81, and the second spring member 82. The holder plate 84 is rotatably supported by the support part with respect to the joystick lever 51 (example of the operating part), the base plate 71 (example of the rotating part), and the support part 42. The first spring member 81 biases the joystick lever 51 to a second predetermined position with respect to the holder plate 84. The second spring member 82 biases the holder plate 84 to a third predetermined position with respect to the base plate 71.

Consequently, the joystick lever 51 can be biased with respect to the base plate 71 by means of the holder plate 84.

In addition, the second predetermined position is, for example, the position of the joystick lever 51 where the straight line L1 passes through the midpoint P3 of the holder plate 84. The third predetermined position is, for example, the position of the holder plate 84 where the straight line that links the midpoint P3 and the center P1 of the rotating shaft 64 passes through the midpoint P4 of the base plate 71.

(7)

The wheel loader 1 (example of the work vehicle) of the present embodiments comprises the abutting members 58 and 59 (example of the abutting parts). The abutting members 58 and 59 are connected to the joystick lever 51 (example of the operating part) and abut against the holder plate 84 when the absolute value of the lever relative angle θd reaches the angle θ2 (example of the first predetermined angle). The first spring member 81 produces a large counterforce in accordance with the absolute value of the lever relative angle θd becoming larger, and produces the counterforce F3 (example of the first counterforce) when the absolute value of the lever relative angle θd is the angle θ2 (example of the first predetermined angle). The second spring member 82 starts to deflect at the counterforce F2 (example of the second counterforce) that is larger than the counterforce F3.

By using the two spring members 81 and 82, the increasing rate of the counterforce with respect to the lever relative angle θd can be increased more when the absolute value of the lever relative angle θd is equal to or greater than the angle θ2, in comparison to when the lever relative angle θd is less than the angle θ2.

(8)

In the wheel loader 1 (example of the work vehicle) of the present embodiments, the biasing part 444 has the cam 481 and the cam follower 482 (example of the pressing part), and the spring members 480. The cam 481 and the cam follower 482 are connected to the joystick lever 51 (example of the operating part) and press the base plate 471 (example of the rotating part). The spring members 480 bias the cam 481 and the cam follower 482 toward the base plate 471. The base plate 471 has a groove part 476 (example of the pressed part) that is pressed by the cam 481 and the cam follower 482. The groove part 476 is formed so that the distance to the joystick lever 51 becomes shorter in accordance with the absolute value of the lever relative angle θd becoming larger, and has the right end 476R (example of the step) and the left end 476L (example of the step) at positions that correspond to the angle ±θ2 (example of the first predetermined angle).

By using the so-called cam mechanism in this way, the increasing rate of the counterforce with respect to the lever relative angle θd can be increased more when the absolute value of the lever relative angle θd is equal to or greater than the angle θ2, in comparison to when the lever relative angle θd is less than the angle θ2.

(9)

In the wheel loader 1 (example of the work vehicle) of the present embodiments, when the joystick lever 51 is operated and rotated to the right or left direction (example of the opposite direction of the predetermined direction) with respect to the base plate 71, 471, the biasing part 444 produces a counterforce that corresponds to the absolute value of the lever relative angle θd when the absolute value of the lever relative angle θd of the joystick lever 51 with respect to the base plate 71, 471 is less than the angle θ2 (example of the third predetermined angle), and increases the counterforce up to F2 (example of the predetermined counterforce) when the absolute value of the lever relative angle θd is at the angle θ2, and after the counterforce at the angle θ2 has reached F2, produces a counterforce that corresponds to the lever relative angle θd.

As a result, the operator is able to sense a sudden increase in the resistance at the angle θ2 when the joystick lever 51 is rotated.

(10)

In the wheel loader 1 (example of the work vehicle) of the present embodiments, the biasing part 44, 444 has the damper 83.

As a result, resistance at the start of movement of the joystick lever 51 can be produced.

Other Embodiments

While an embodiment of the present disclosure has been explained above, the present disclosure is not limited to the above embodiment and various changes are possible within the scope of the present disclosure.

(A)

Figure 15:
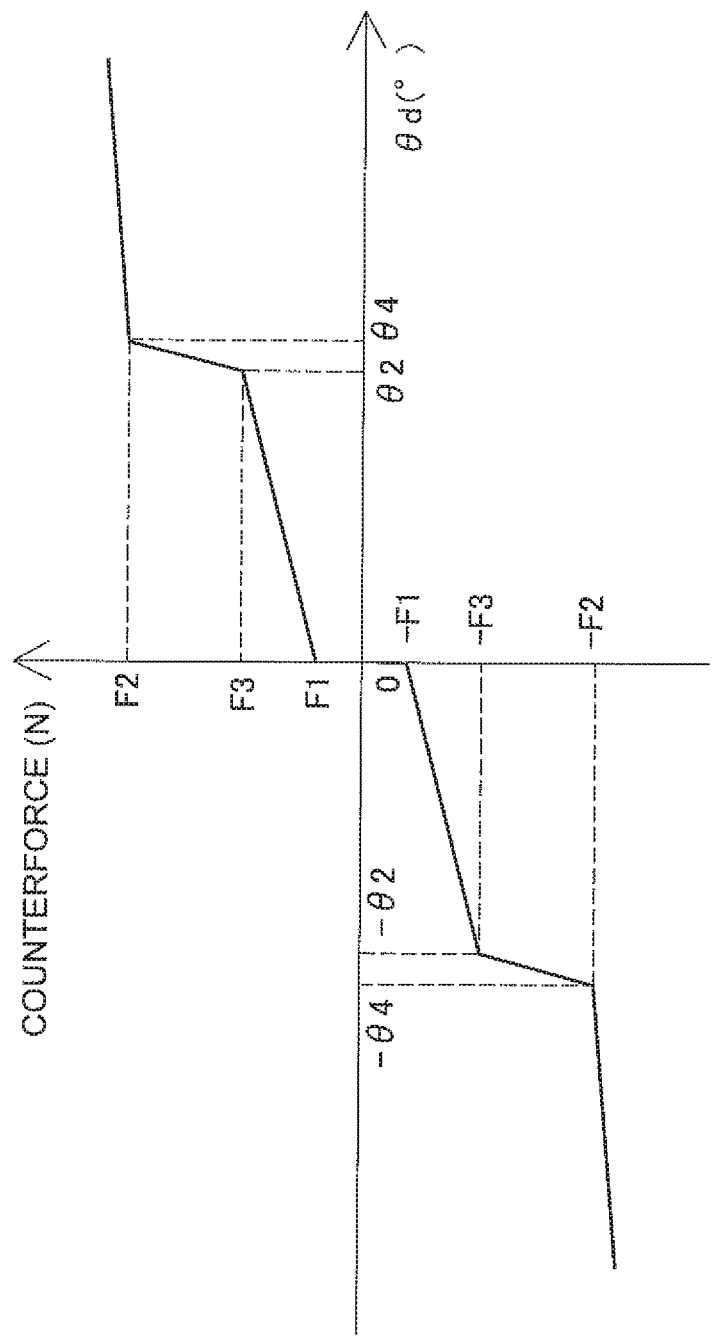
FIG. 15 is a view illustrating counterforces with respect to the lever relative angle in a modified example of the embodiments according to the present invention.

While the increasing rate of the counterforce illustrated in FIG. 5 in the above embodiments rises vertically, the increasing rate may be sloped as illustrated in FIG. 15. The angle +θ2 is provided as an example of the first predetermined angle and the angle −θ2 is provided as an example of the third predetermined angle. The angle +θ4 is provided as an example of the second predetermined angle and the angle −θ4 is provided as an example of the fourth predetermined angle. In FIG. 15, the increasing rate of the counterforce while the absolute value of the lever relative angle θd moves from angle θ2 to angle θ4 is greater than the increasing rate of the counterforce while the absolute value of the lever relative angle θd moves from zero to angle θ2.

Additionally, the increasing rate of the counterforce while the absolute value of the lever relative angle θd is equal to or greater than θ4 is smaller than the increasing rate of the counterforce while the absolute value of the lever relative angle θd is in a range from zero to θ2.

(B)

Figure 16:
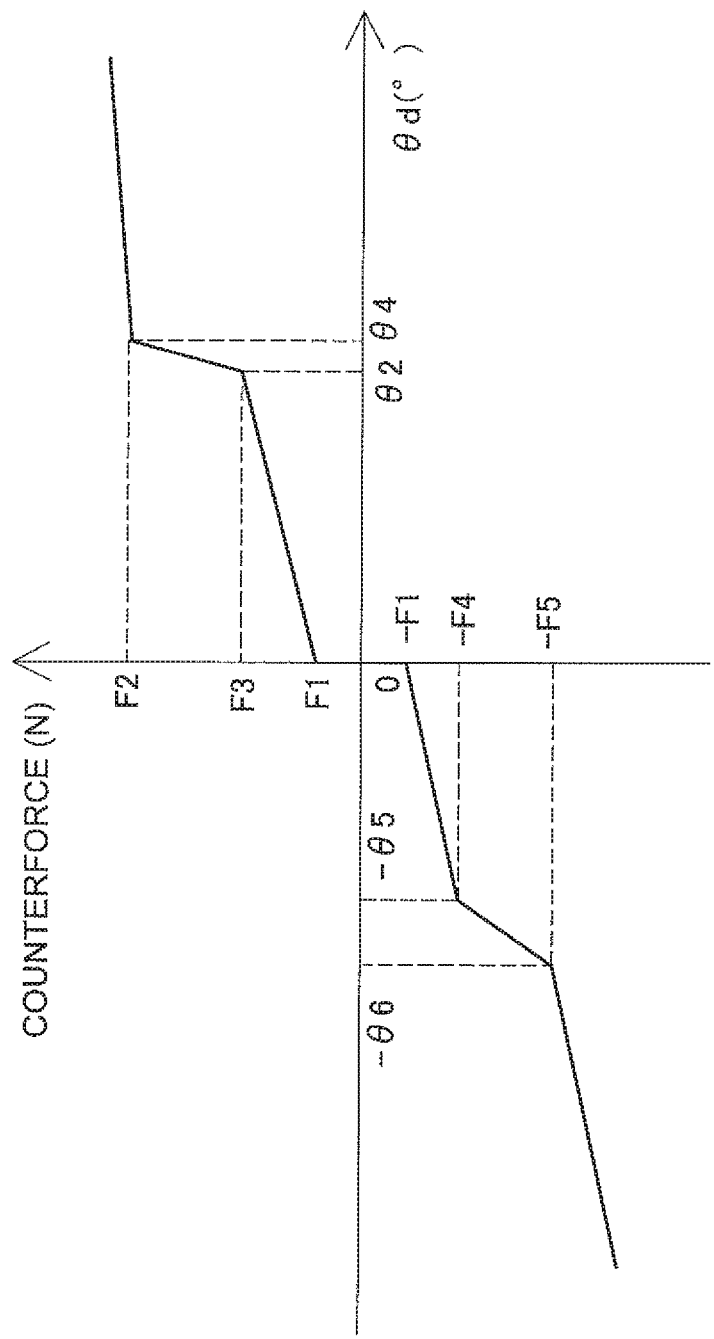
FIG. 16 is a view illustrating counterforces with respect to the lever relative angle in a modified example of the embodiments according to the present invention.

While the increasing rates of the counterforces are symmetrical with respect to the point of origin as illustrated in FIG. 5 and FIG. 14 in the above embodiments, the increasing rates of the counterforces may not be symmetrical with respect to the point of origin as illustrated in FIG. 16. In FIG. 16, when the joystick lever 51 is rotated to the left side, the increasing rate of the counterforce when |θd| is θ5 is greater in comparison to when |θd| is less than θ5, and furthermore, the increasing rate of the counterforce when |θd| is θ6 is smaller in comparison to when |θd| is between θ5 and θ6. In this case, −θ5 corresponds to an example of the third predetermined angle and −θ6 corresponds to an example of the fourth predetermined angle.

In addition the size of the counterforce at the lever relative angle where the increasing rate changes may also differ between when the joystick lever 51 is rotated to the right side and when rotated to the left side. In FIG. 16, the counterforce becomes F4 when the lever relative angle during the left rotation becomes −θ5 which differs from the counterforce becoming the counterforce F3 at θ2 during the right rotation. In addition, the counterforce at −θ6 during the left rotation becomes F5 which differs from the counterforce becoming the counterforce F2 at 84 during the right rotation. The counterforce when the lever relative angle is −θ2 may be F4 and the counterforce when the lever relative angle is −θ6 may be F5 in FIG. 14.

(C)

While the electric motor 91 is an example of an actuator for rotating the base plate 71, 471 in the above embodiment, the actuator is not limited to an electric motor and may be a hydraulic motor or in short an actuator that is able to produce the force to be imparted.

(D)

While the worm gear 94 is used to transmit the driving power of the electric motor 91 to the transmission gear part 74 in the above embodiment, a toothed gear may be used for transmitting the driving power of the electric motor 91 to the transmission gear part 74 without using a worm gear. However, the use of a worm gear is preferred in order to have a self-locking function.

(E)

While the above embodiment is configured so that the supply amount of oil to be supplied from the hydraulic valve 31 to the steering cylinders 21 and 22 is controlled in response to the pilot pressure inputted from the solenoid pilot valve 33 which is an example of the control valve, the oil may be supplied directly to the steering cylinders 21 and 22 from the solenoid pilot valve 33 without the intermediation of the hydraulic valve 31. That is, a solenoid main valve may be used in place of the solenoid pilot valve 33.

(F)

While the damper 83 is provided to the biasing part 44, 444 in the above embodiment, the present disclosure is not limited to a damper and a friction brake may be provided, damper and the friction brake may be provided, or the damper or the friction brake may not be provided.

(G)

While the ranges of the base plate angle and the lever angle (angle scales) are the same as the range of the vehicle body frame (angle scale) in the above embodiment, the ranges (angle scale) of the base plate angle and the lever angle may be narrower than the range (angle scale) of the vehicle body frame angle.

(H)

While the joystick lever 51 is supported by the support part 42 in the above embodiment, the joystick lever 51 may be rotatably supported by the base plate 71, 471. Moreover, the joystick lever 51 may be rotatably supported by the base part 43, 443 provided in the base plate 71, 471.

(I)

While a wheel loader 1 is used in the explanations as an example of the work vehicle in the above embodiments, an articulated dump truck or motor grader and the like may also be used.

(J)

While the joystick lever 51 is operated as an example of an operating part and the flow rate to the steering cylinders 21 and 22 is controlled, the present disclosure is not limited to a joystick lever and a steering wheel may be used.

FIG. 17A is a schematic view illustrating a configuration when using a steering wheel 551 as an operating unit 525. A steering unit 541, a support part 542, a base part 543, a biasing part 544, and a position adjusting part 545 are provided to the operating unit 525 illustrated in FIG. 17A. The steering unit 541 has the steering wheel 551, a transmission shaft 552, and a rotating member 553. The steering wheel 551 is operated and rotated by an operator. The transmission shaft 552 couples the rotating member 553 to the steering wheel 551 and transmits the rotation of the steering wheel 551 to the rotating member 553.

The base part 543 has a rotating plate 571 and a cylindrical part 572. The support part 542 serves as a shaft support for allowing the rotating plate 571 to rotate. A gear shape is formed on the end surface of the rotating plate 571. The cylindrical part 572 is fixed to the rotating plate 571.

FIG. 17B is a reference arrow cross-sectional view along line G to G' in FIG. 17A. FIG. 17C is a reference arrow cross-sectional view along line H to H' in FIG. 17A. The biasing part 544 has a first spring member 581, a second spring member 582, and a holder part 583. The holder part 583 is cylindrical and is rotatably fitted inside the cylindrical part 572. A rotating member 553 is rotatably fitted to the holder part 583. The first spring member 581 is, for example, a plate spring and passes through the rotating member 553 as illustrated in FIG. 17B and both ends of the first spring member 581 are fixed to the holder part 583. The second spring member 582 is, for example, a plate spring and penetrates the holder part 583 as illustrated in FIG. 17C, and both ends of the second spring member 582 are fixed to the cylindrical part 572. The second spring member 582 does not pass through the rotating member 553.

The position adjusting part 545 has an electric motor 591 and an output gear 592. The output gear 592 is fixed to the output shaft of the electric motor 591 and engages with the rotating plate 571.

According to the above configuration, when the operator rotates the steering wheel 551, a counterforce is produced by the biasing part 544. Additionally, when the rotating member 553 rotates a predetermined angle with respect to the holder part 583 in opposition to the counterforce of the first spring member 581, an abutting part (not illustrated) of the rotating member 553 abuts against the holder part 583. In order to rotate the rotating member 553 further from this position, the rotating member 553 rotates in opposition to the counterforce of the second spring member 582. By applying a difference between the counterforce of the first spring member 581 and the counterforce of the second spring member 582 as illustrated in FIG. 5, the operator is able to clearly perceive a feeling of resistance.

In addition, the rotation angle $\theta i$ of the rotating member 553 is detected as a detection value $\theta i\_detect$ of the rotation angle and the steering operation is performed on the basis of the detection value $\theta i\_detect$ of the rotation angle. The electric motor 591 is driven on the basis of the detection value $\theta s\_detect$ of the vehicle body frame angle, the rotating plate 571 is rotated, and the cylindrical part 573 is changed to the actual rotation angle $\theta b\_real$ that corresponds to the detection value $\theta s\_detect$ of the vehicle body frame angle.

As described above, the present invention is applicable so long as the work vehicle is one in which the steering angle is changed.

(K)

In the steering operating device 8 of the first embodiment, the steering control part 120 controls the solenoid pilot valve 33 by using the detection value $\theta i\_detect$ of the lever angle detected by the lever angle sensor 26 and the detection value $\theta s\_detect$ of the vehicle body frame angle detected by the vehicle body frame angle sensor 24. However, the present invention is not limited in this way.

Because the actual base plate angle $\theta b\_real$ is controlled so as to be arranged in a position corresponding to the actual vehicle body frame angle $\theta s\_real$ as described in the first embodiment, the detection value $\theta b\_detect$ of the base plate angle may be used in place of the detection value $\theta s\_detect$ of the vehicle body frame angle. In this case, the deviation angle between the detection value $\theta b\_detect$ of the base plate angle and the detection value $\theta i\_detect$ of the lever angle is derived.

(L)

While the lever angle sensor 26 that detects the rotation angle of the joystick lever 51 with respect to the support part 42 is provided in the above embodiments, a lever relative angle sensor that calculates the angle of the joystick lever 51 with respect to the base plate 71 may be provided.

The detection value $\theta d\_detect$ of the lever relative angle corresponds to the difference (deviation angle) between the rotation angle of the joystick lever 51 with respect to the support part 42 and the rotation angle of the base plate 71 with respect to the support part 42. As a result, the steering control part 120 controls the solenoid pilot valve 33 on the basis of the lever relative angle $\theta d$.

(M)

While the right end 476R and the left end 476L of the groove part 476 form inflection points in the second embodiment, the shape is not limited to the shape illustrated in FIG. 14E and an edge may be formed by a straight line and a straight line in a cross-sectional view.

The work vehicle of the present invention demonstrates the effect of reducing the size and enabling an operator to perceive information related to the work vehicle, and the present invention is useful as a wheel loader or the like.

What is claimed is:

1. A work vehicle comprising:
   a hydraulic actuator configured to change an actual steering angle;
   an actual steering angle detecting part configured to detect the actual steering angle;
   an operating unit configured to perform a steering operation, the operating unit including
      a support part,
      a rotating part supported rotatably by the support part,
      an operating part supported rotatably with respect to the support part and the rotating part, the operating part being configured to be operated and rotated by an operator,
      a biasing part biasing the operating part to a predetermined position with respect to the rotating part, and
      a position adjusting part configured to adjust a rotation angle of the rotating part with respect to the support part; an operator's seat; and a console box arranged to a side of the operator's seat, the support part being fixed to the console box, and the position adjusting part being disposed between the support part and the rotating part
   a position adjustment control part configured to output a command signal to control the position adjusting part based on the actual steering angle; and
   a steering control part configured to control the hydraulic actuator based on rotation and operation of the operating part,
   the biasing part, in a situation in which the operating part is operated and rotated in a predetermined direction with respect to the rotating part,
      when an absolute value of a relative angle of the operating part with respect to the rotating part is equal to or greater than a first predetermined angle, increasing an increasing rate of a counterforce with respect to the relative angle more in comparison to when the absolute value of the relative angle is less than the first predetermined angle, and
      when the absolute value of the relative angle is equal to or greater than a second predetermined angle that is equal to or greater than the first predetermined angle, reducing the increasing rate of the counterforce with respect to the relative angle more than in comparison to when the absolute value of the relative angle is smaller than the second predetermined angle and the absolute value of the relative angle is equal to or greater than the first predetermined angle.

2. A work vehicle comprising:
   a hydraulic actuator configured to change an actual steering angle;
   an actual steering angle detecting part configured to detect the actual steering angle;
   an operating unit configured to perform a steering operation, the operating unit including
      a support part,
      a rotating part supported rotatably by the support part,
      an operating part supported rotatably with respect to the support part and the rotating part, the operating part being configured to be operated and rotated by an operator,
      a biasing part biasing the operating part to a predetermined position with respect to the rotating part, and
      a position adjusting part configured to adjust a rotation angle of the rotating part with respect to the support part an operator's seat; and a console box arranged to a side of the operator's seat, the support part being fixed to the console box, and the position adjusting part being disposed between the support part and the rotating part;
   a position adjustment control part configured to output a command signal to control the position adjusting part based on the actual steering angle; and
   a steering control part configured to control the hydraulic actuator based on the rotation and operation of the operating part,
   the biasing part, in a situation in which the operating part is operated and rotated in a predetermined direction with respect to the rotating part,
      when an absolute value of a relative angle of the operating part with respect to the rotating part is less than a first predetermined angle, producing a counterforce that corresponds to the absolute value of the relative angle,
      increasing the counterforce up to a predetermined counterforce when the absolute value of the relative angle is the first predetermined angle, and
      producing a counterforce corresponding to the relative angle after the counterforce at the first predetermined angle reaches of the predetermined counterforce.

3. The work vehicle according to claim 1, wherein
   the absolute value of the first predetermined angle is larger than the absolute value of the relative angle when the acting speed of the hydraulic actuator reaches the greatest acting speed.

4. The work vehicle according to claim 3, further comprising:
   a steering valve configured to control a flow rate of oil supplied to the hydraulic actuator based on the rotation and operation of the operating part,
   the absolute value of the relative angle when the acting speed of the hydraulic actuator reaches the greatest acting speed being the absolute value of the relative angle when the flow rate supplied from the steering valve reaches the maximum flow rate.

5. The work vehicle according to claim 1, further comprising:
   a control valve configured to control a flow rate of oil supplied to the hydraulic actuator based on the rotation and operation of the operating part,
   the control valve being in a neutral position while the operating unit is arranged in the predetermined position.

6. The work vehicle according to claim 1, wherein
   the predetermined position is a position where the relative angle is zero.

7. The work vehicle according to claim 1, wherein
   the biasing part includes
      an intermediate rotating part rotatably supported by the support part with respect to the operating part, the rotating part, and the support part,
      a first spring member biasing the operating part to a second predetermined position with respect to the intermediate rotating part, and
      a second spring member biasing the intermediate rotating part to a third predetermined position with respect to the rotating part.

8. The work vehicle according to claim 7, wherein
   the biasing part includes an abutting part connected to the operating part, the abutting part being configured to abut against the intermediate rotating part when the absolute value of the relative angle reaches the first predetermined angle, the first spring member
- produces a larger counterforce in accordance with the absolute value of the relative angle becoming larger, and
- produces a first counterforce when the absolute value of the relative angle is the first predetermined angle, and the second spring member starts to deflect at a second counterforce that is larger than the first counterforce.

9. The work vehicle according to claim 1, wherein
the biasing part includes
- a pressing part connected to the operating part and pressing the rotating part, and
- a spring member biasing the pressing part toward the rotating part, and the rotating part includes a pressed part pressed by the pressing part, and the pressed part is formed so that distance to the operating part decreases in accordance with the absolute value of the relative angle becoming larger, and the pressed part includes a step in a position corresponding to the first predetermined angle.

10. The work vehicle according to claim 1, wherein
the biasing part, in a situation in which the operating part is operated and rotated with respect to the rotating part in a direction opposite to the predetermined direction,
- when the absolute value of the relative angle of the operating part with respect to the rotating part is equal to or greater than a third predetermined angle, increases the increasing rate of a counterforce with respect to the relative angle more in comparison to when the absolute value of the relative angle is less than the third predetermined angle, and
- when the absolute value of the relative angle is equal to or greater than a fourth predetermined angle which is an angle equal to or greater than the third predetermined angle, decreases the increasing rate of the counterforce with respect to the relative angle more in comparison to when the absolute value of the relative angle is smaller than the fourth predetermined angle and the absolute value of the relative angle is equal to or greater than the third predetermined angle.

11. The work vehicle according to claim 1, wherein
the biasing part, in a situation in which the operating part is operated and rotated with respect to the rotating part in a direction opposite to the predetermined direction,
- when an absolute value of the relative angle of the operating part with respect to the rotating part is less than a third predetermined angle, produces a counterforce that corresponds to the absolute value of the relative angle,
- increases the counterforce up to a predetermined counterforce when the absolute value of the relative angle is the third predetermined angle, and
- produces a counterforce corresponding to the relative angle after the counterforce at the third predetermined angle reaches of the predetermined counterforce.

12. The work vehicle according to claim 2, wherein
the absolute value of the first predetermined angle is larger than the absolute value of the relative angle when the acting speed of the hydraulic actuator reaches the greatest acting speed.

13. The work vehicle according to claim 2, further comprising:
a control valve configured to control a flow rate of oil supplied to the hydraulic actuator based on the rotation and operation of the operating part,
the control valve being in a neutral position while the operating unit is arranged in the predetermined position.

14. The work vehicle according to claim 2, wherein
the predetermined position is a position where the relative angle is zero.

15. The work vehicle according to claim 2, wherein
the biasing part includes
- an intermediate rotating part rotatably supported by the support part with respect to the operating part, the rotating part, and the support part,
- a first spring member biasing the operating part to a second predetermined position with respect to the intermediate rotating part, and
- a second spring member biasing the intermediate rotating part to a third predetermined position with respect to the rotating part.

16. The work vehicle according to claim 2, wherein
the biasing part includes
- a pressing part connected to the operating part and pressing the rotating part, and
- a spring member biasing the pressing part toward the rotating part, and the rotating part includes a pressed part pressed by the pressing part, and the pressed part is formed so that distance to the operating part decreases in accordance with the absolute value of the relative angle becoming larger, and the pressed part includes a step in a position corresponding to the first predetermined angle.

17. The work vehicle according to claim 2, wherein
the biasing part, in a situation in which the operating part is operated and rotated with respect to the rotating part in a direction opposite to the predetermined direction,
- when the absolute value of the relative angle of the operating part with respect to the rotating part is equal to or greater than a third predetermined angle, increases the increasing rate of a counterforce with respect to the relative angle more in comparison to when the absolute value of the relative angle is less than the third predetermined angle, and
- when the absolute value of the relative angle is equal to or greater than a fourth predetermined angle which is an angle equal to or greater than the third predetermined angle, decreases the increasing rate of the counterforce with respect to the relative angle more in comparison to when the absolute value of the relative angle is smaller than the fourth predetermined angle and the absolute value of the relative angle is equal to or greater than the third predetermined angle.

18. The work vehicle according to claim 2, wherein
the biasing part, in a situation in which the operating part is operated and rotated with respect to the rotating part in a direction opposite to the predetermined direction,
- when an absolute value of the relative angle of the operating part with respect to the rotating part is less than a third predetermined angle, produces a counterforce that corresponds to the absolute value of the relative angle, increases the counterforce up to a predetermined counterforce when the absolute value of the relative angle is the third predetermined angle, and produces a counterforce corresponding to the relative angle after the counterforce at the third predetermined angle reaches of the predetermined counterforce.

* * * * *